United States Patent
Fukui et al.

(10) Patent No.: US 10,407,815 B2
(45) Date of Patent: Sep. 10, 2019

(54) POWER GENERATING DEVICE AND APPARATUS HAVING THE SAME

(71) Applicant: LG ELECTRONICS INC., Seoul (KR)

(72) Inventors: Ikuma Fukui, Seoul (KR); Hiroyuki Inoue, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 658 days.

(21) Appl. No.: 14/781,741

(22) PCT Filed: Jun. 23, 2014

(86) PCT No.: PCT/KR2014/005528
§ 371 (c)(1),
(2) Date: Oct. 1, 2015

(87) PCT Pub. No.: WO2014/208959
PCT Pub. Date: Dec. 31, 2014

(65) Prior Publication Data
US 2016/0049847 A1 Feb. 18, 2016

(30) Foreign Application Priority Data

Jun. 25, 2013 (KR) .................... 10-2013-0073084
Oct. 25, 2013 (KR) .................... 10-2013-0127809
(Continued)

(51) Int. Cl.
*D06F 37/30* (2006.01)
*H02K 7/11* (2006.01)
(Continued)

(52) U.S. Cl.
CPC ............. *D06F 37/304* (2013.01); *H02K 7/11* (2013.01); *H02K 7/14* (2013.01); *H02K 16/02* (2013.01); *H02K 49/102* (2013.01); *D06F 37/30* (2013.01)

(58) Field of Classification Search
CPC ......... D06F 37/30; D06F 37/304; H02K 7/11; H02K 7/14; H02K 16/02; H02K 49/102
(Continued)

(56) References Cited

U.S. PATENT DOCUMENTS 3,630,102 A 12/1971 Larsen
5,569,111 A 10/1996 Cho et al.
(Continued)

FOREIGN PATENT DOCUMENTS

CN 1517473 8/2004
CN 201113495 Y 9/2008
(Continued)

OTHER PUBLICATIONS

International Search Report issued in Application No. PCT/KR2014/005528 dated Oct. 3, 2014.
(Continued)

*Primary Examiner* — Levon J Shahinian
(74) *Attorney, Agent, or Firm* — KED & Associates LLP

(57) ABSTRACT

Disclosed are a power generating device (5) and a clothes treatment apparatus having the power generating device (5). The power generating device (5) includes a magnetic field producer (51) configured to produce a rotating magnetic field, a power transmitter (55) configured to be rotated by the rotating magnetic field provided by the magnetic field producer (51) and an output unit (53) configured to transmit torque provided by the power transmitter (55) to the drum so as to rotate the drum.

20 Claims, 17 Drawing Sheets

(30) Foreign Application Priority Data

Apr. 7, 2014 (KR) .......................... 10-2014-0041133
Apr. 7, 2014 (KR) .......................... 10-2014-0041134

(51) Int. Cl.
*H02K 7/14* (2006.01)
*H02K 16/02* (2006.01)
*H02K 49/10* (2006.01)

(58) Field of Classification Search
USPC ...... 68/12.02, 12.24, 13 R, 24, 58, 139, 140
See application file for complete search history.

(56) References Cited

U.S. PATENT DOCUMENTS

2004/0139768 A1* 7/2004 Kim .................... D06F 37/304
 68/12.24
2004/0245878 A1* 12/2004 Kim .................... D06F 37/304
 310/114
2011/0121672 A1* 5/2011 Calverley ................ H02K 1/08
 310/103

FOREIGN PATENT DOCUMENTS

| CN | 101542035 A | 9/2009 |
| EP | 1 439 255 | 7/2004 |
| WO | WO 2008/085931 A2 | 7/2008 |

OTHER PUBLICATIONS

Chinese Office Action dated Jun. 17, 2016 issued in Application No. 201480021986.9 (with English Translation).
European Search Report dated Oct. 19, 2016 issued in Application No. 14817537.5.
Chinese Office Action dated Dec. 19, 2016 issued in Application No. 201480021986.9 (with English translation).

* cited by examiner

[Fig. 1]

[Fig. 3]
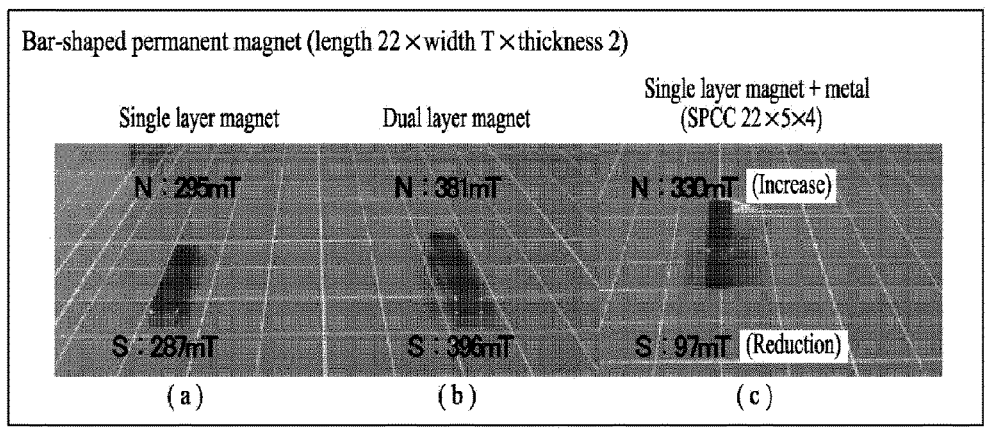
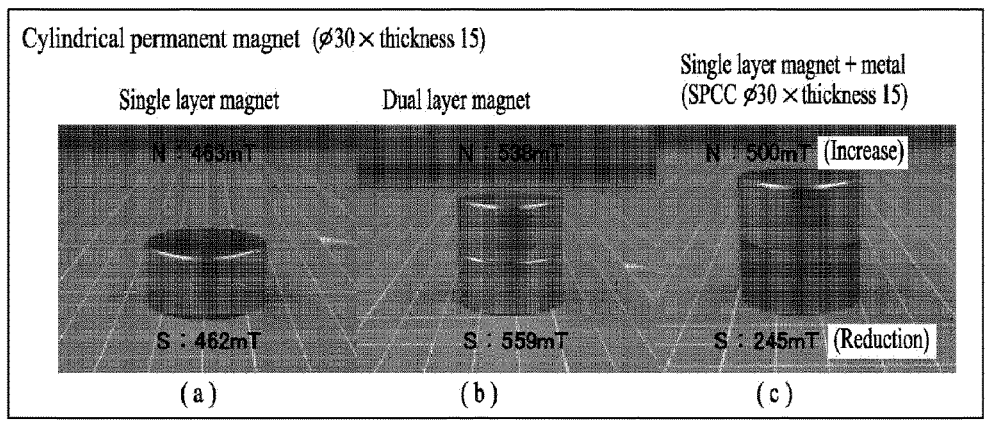

[Fig. 4]
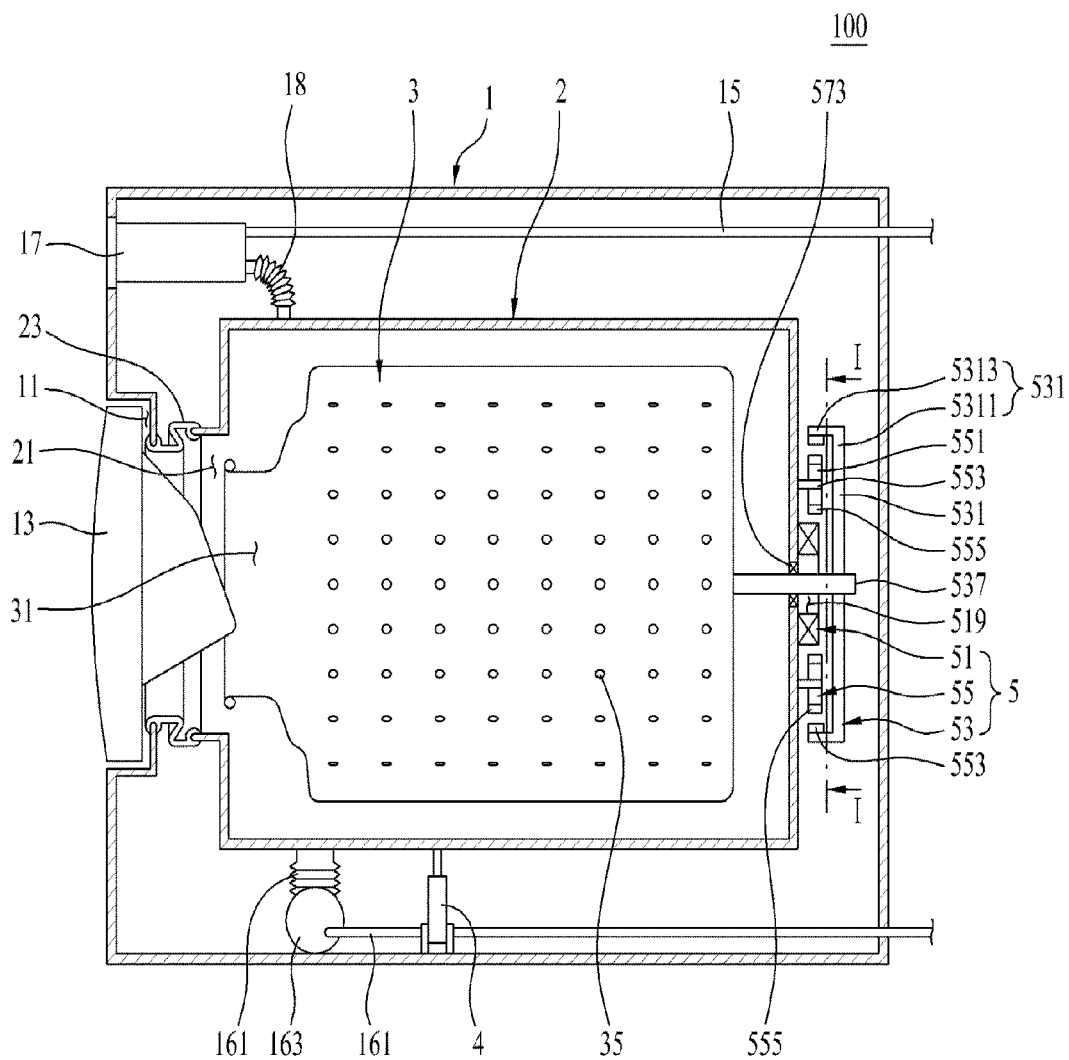

[Fig. 5]
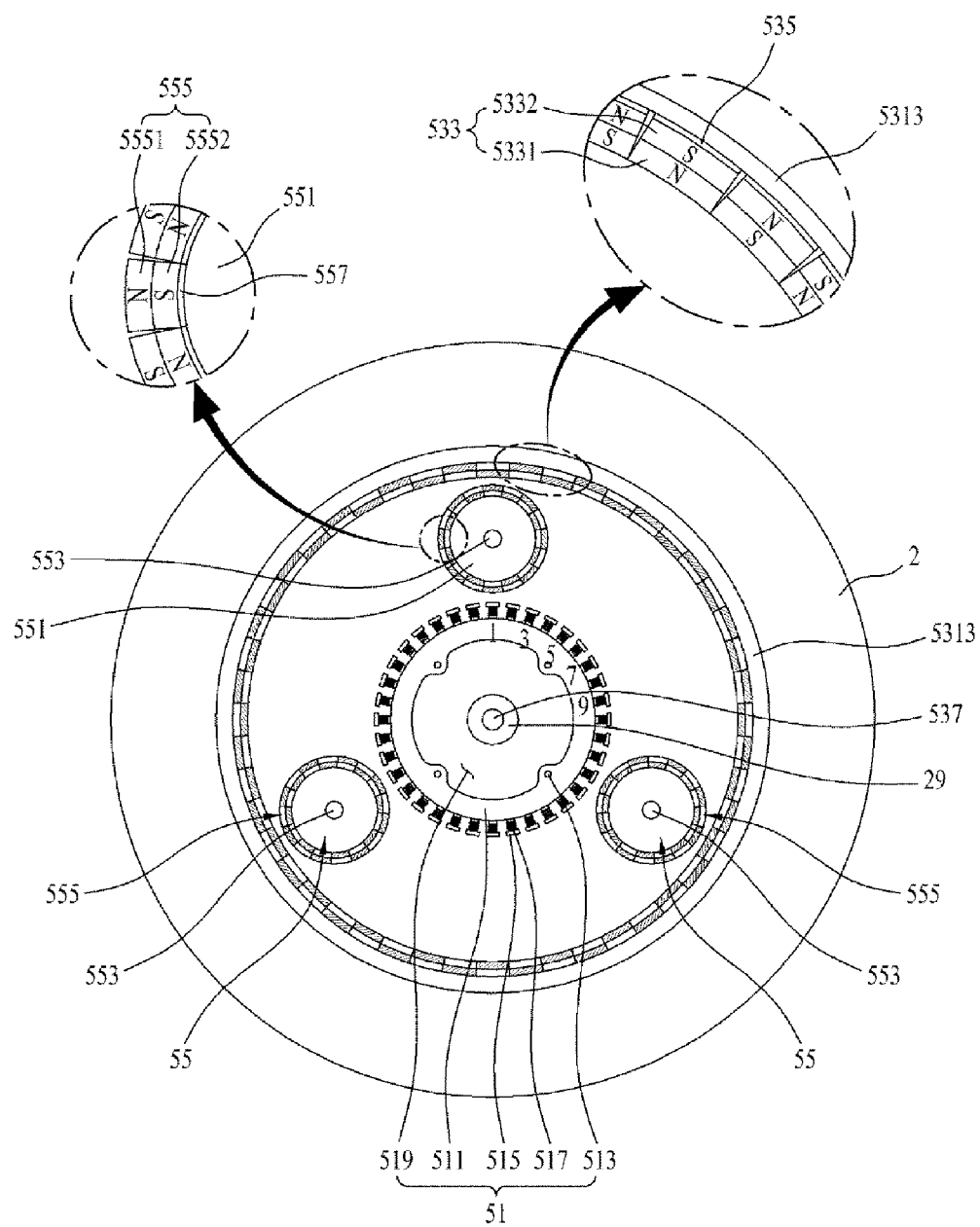

[Fig. 6]
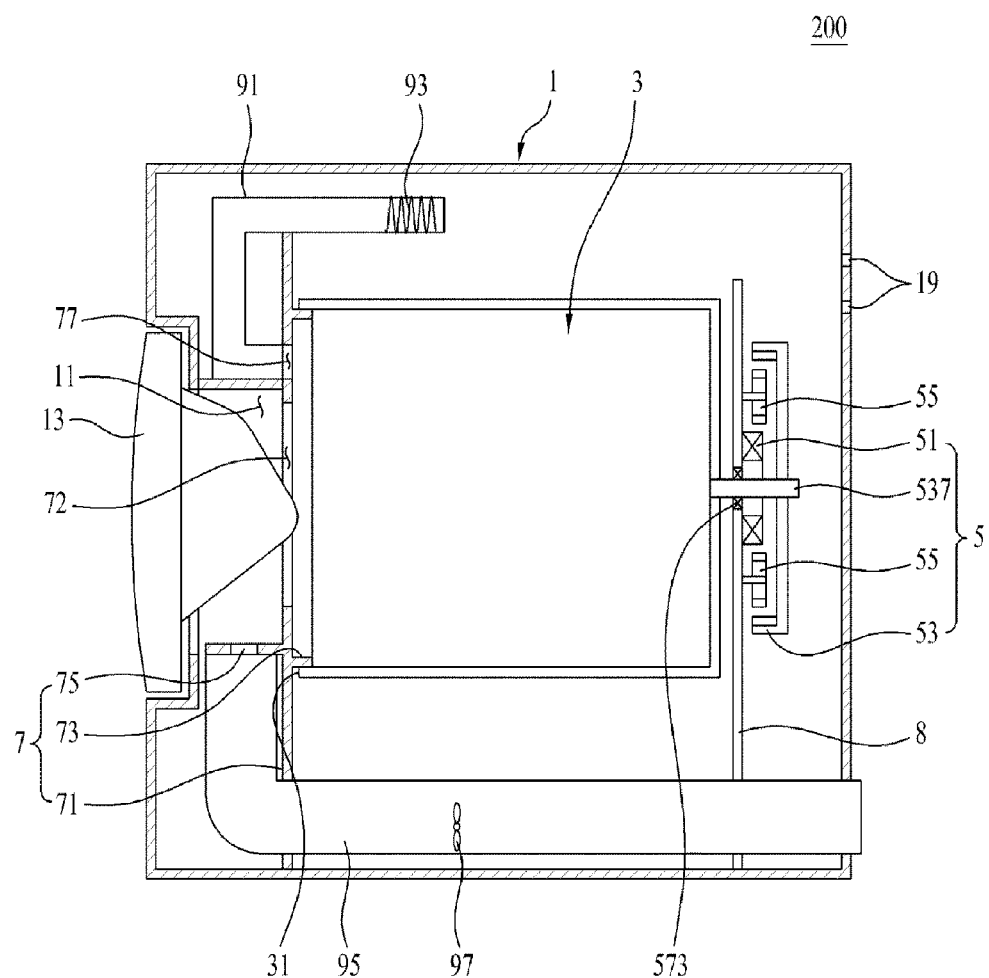

[Fig. 7]
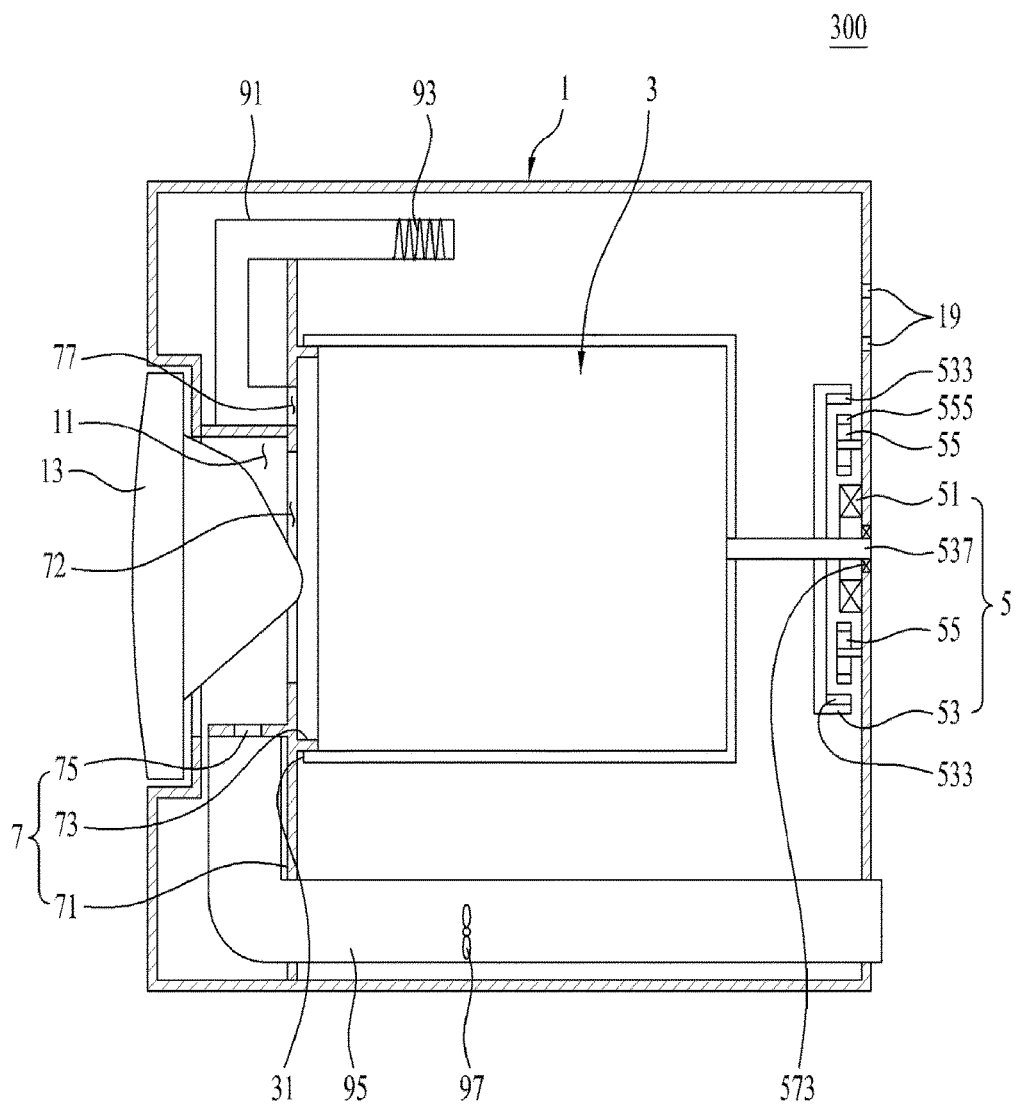

[Fig. 8]
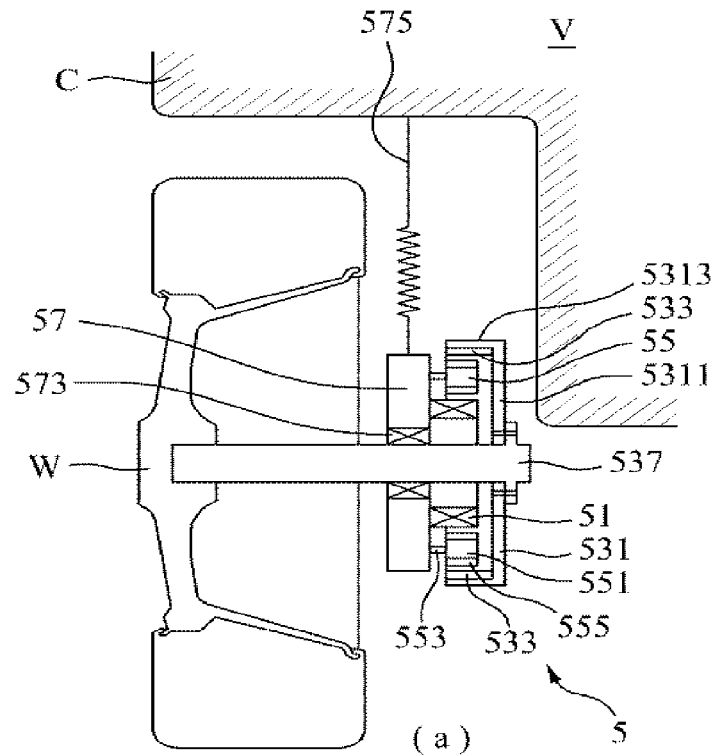
(a)
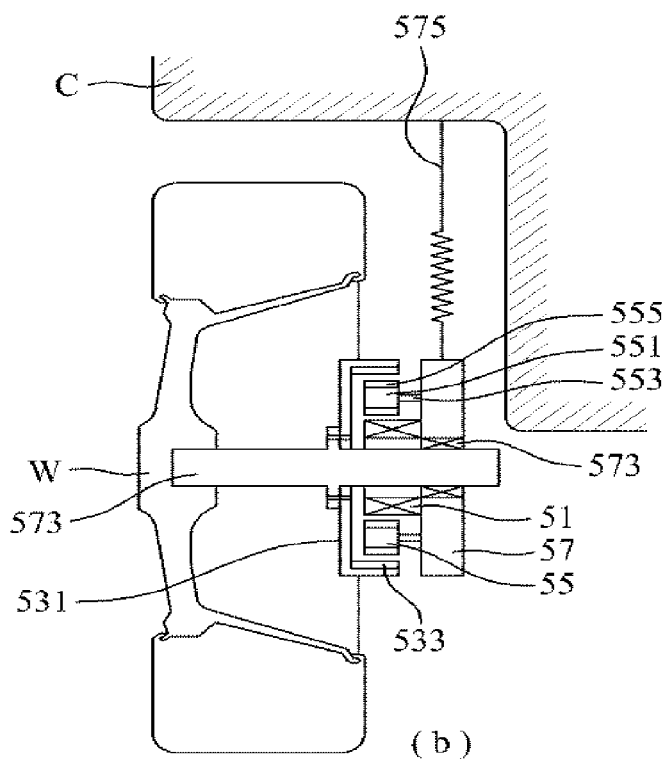
(b)

[Fig. 9]
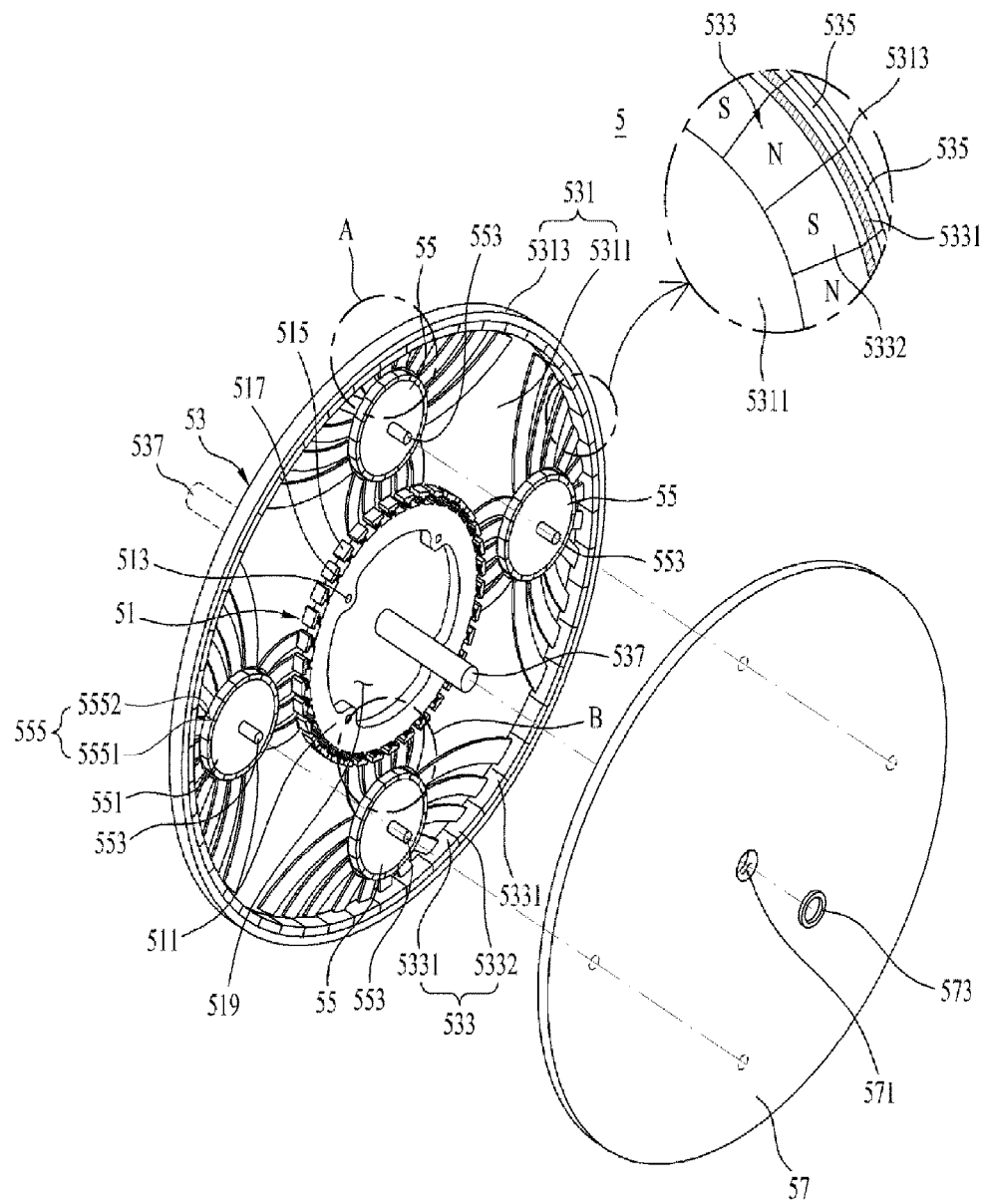

[Fig. 10]
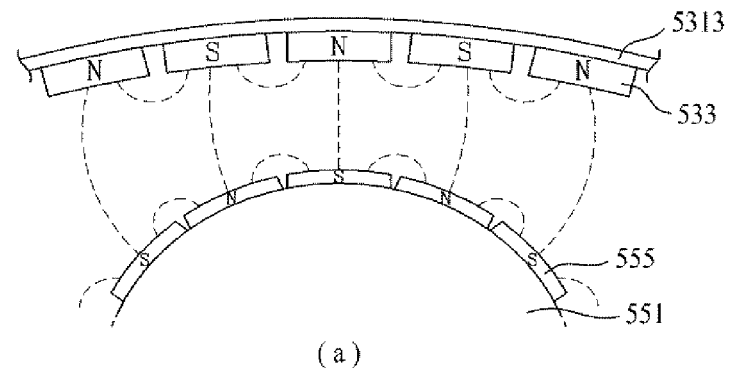
(a)
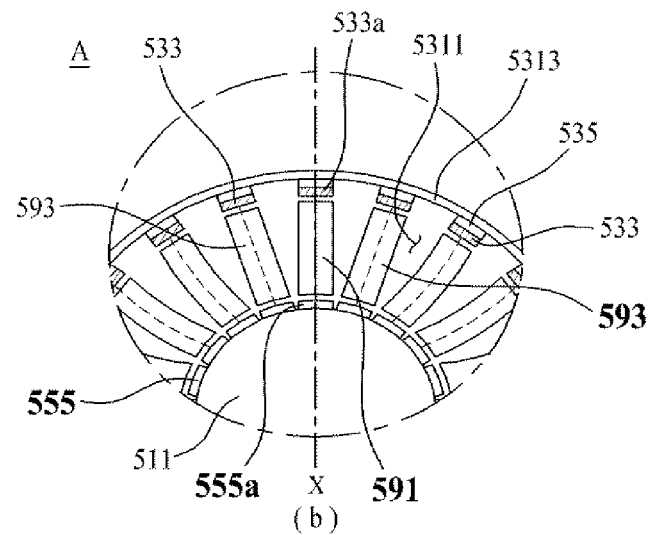
(b)
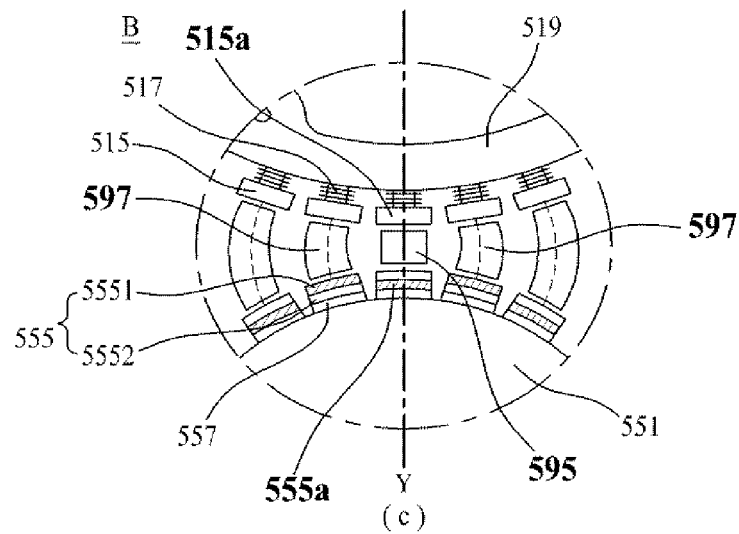
(c)

[Fig. 11]
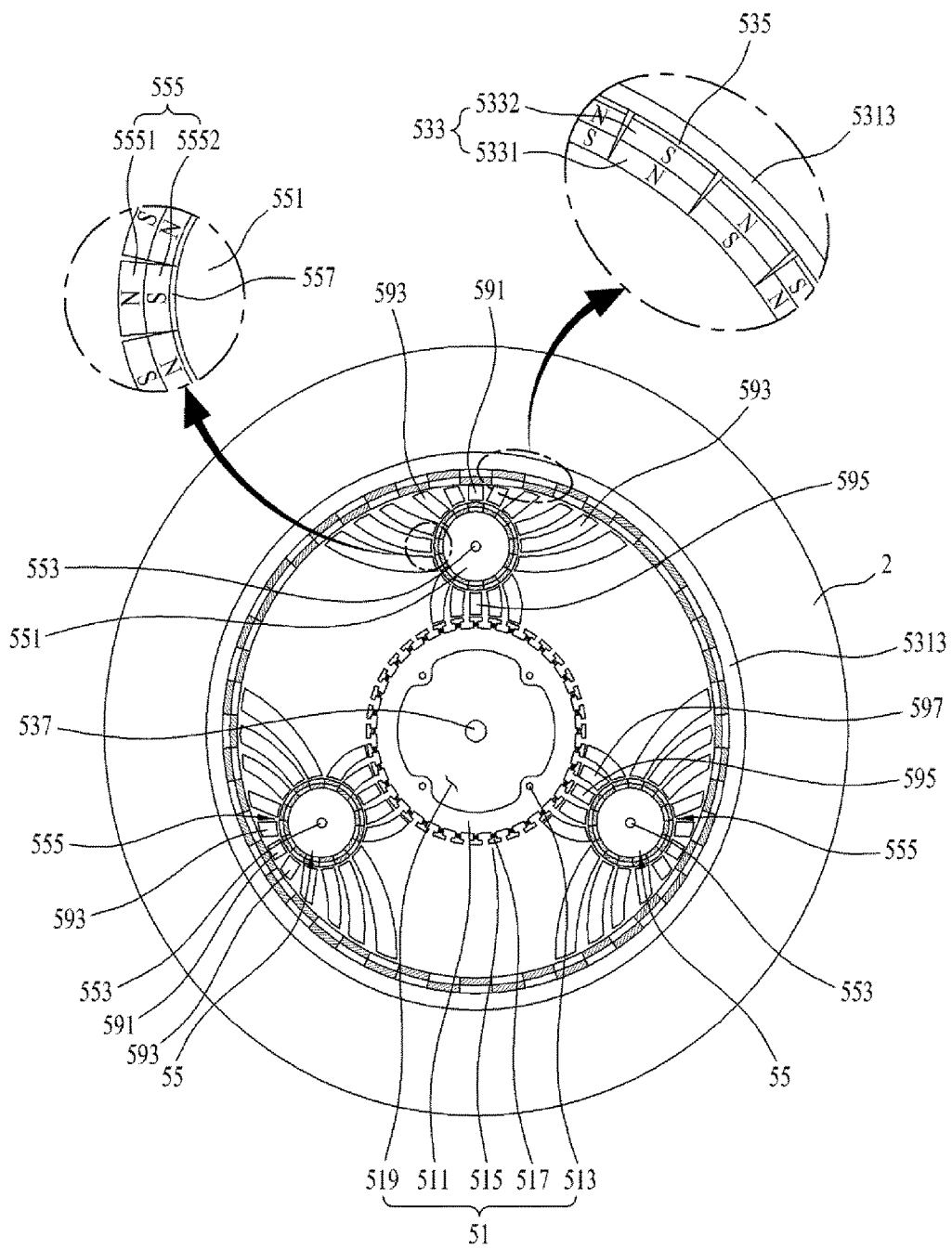

[Fig. 12]
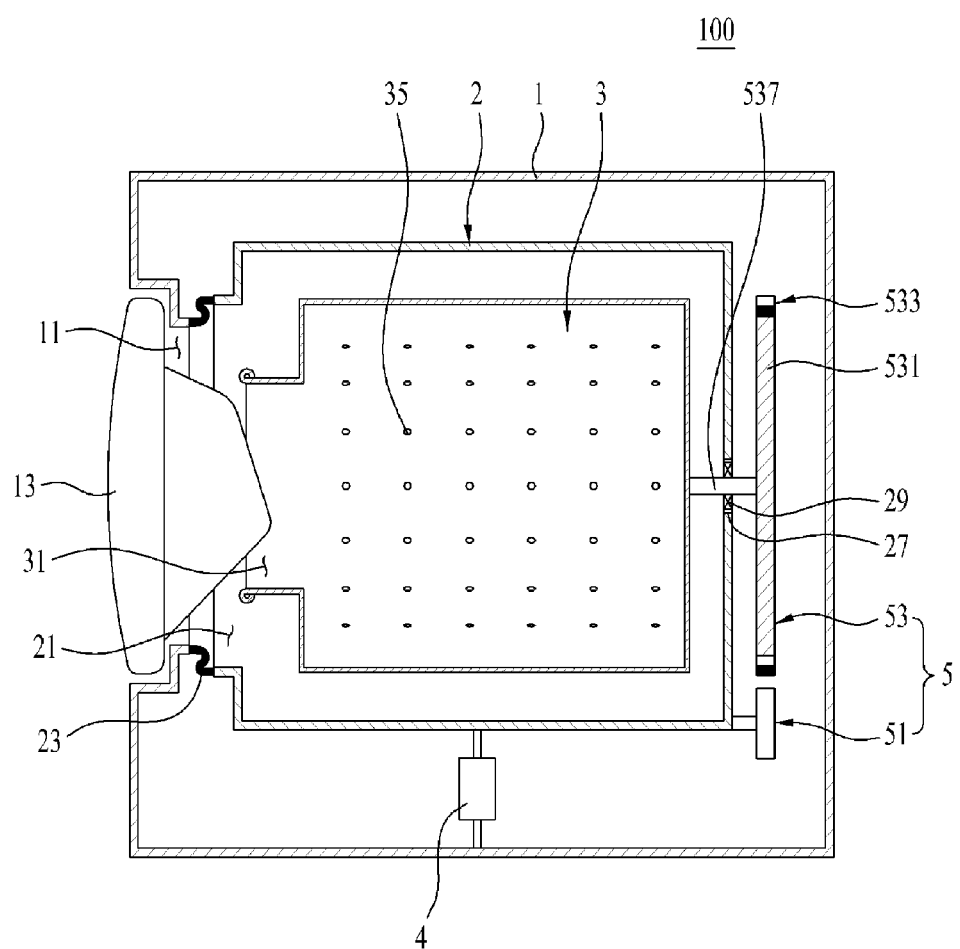

[Fig. 13]
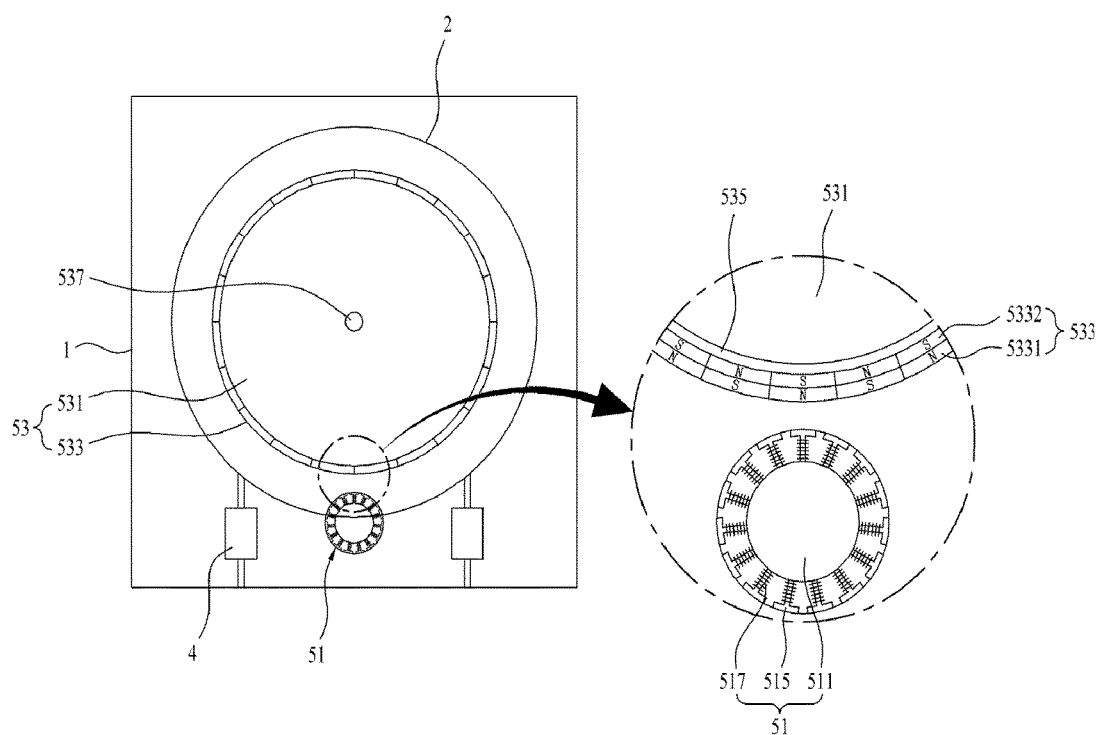

[Fig. 14]
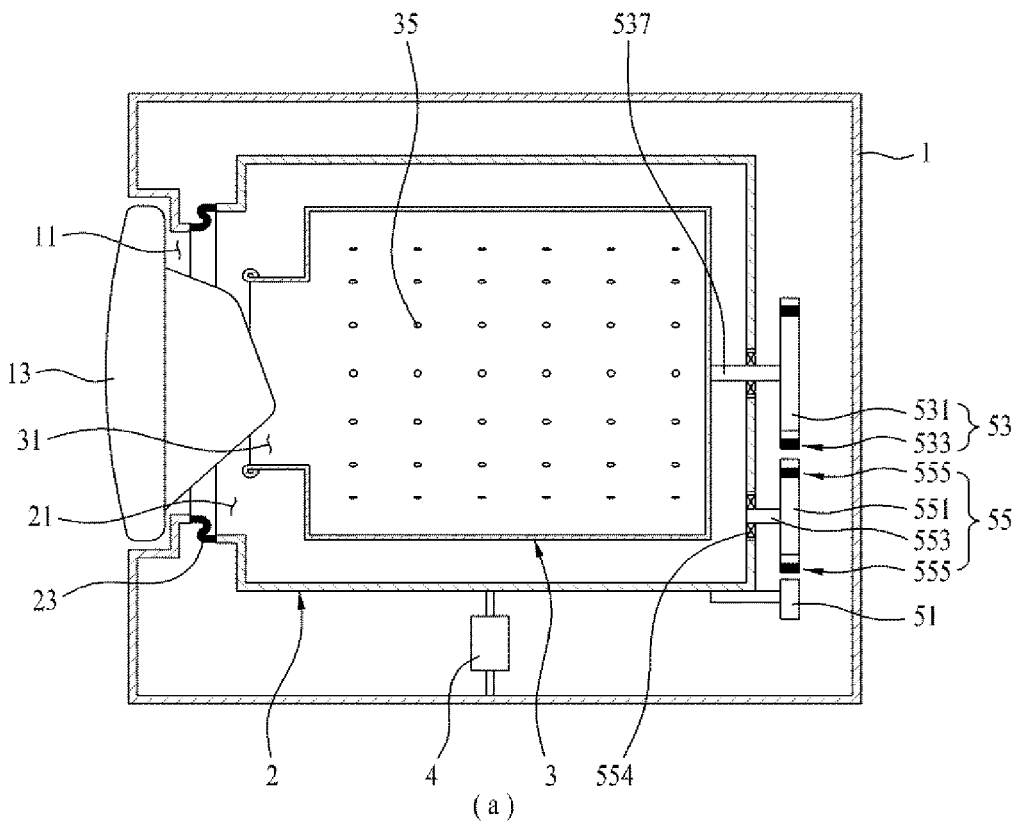
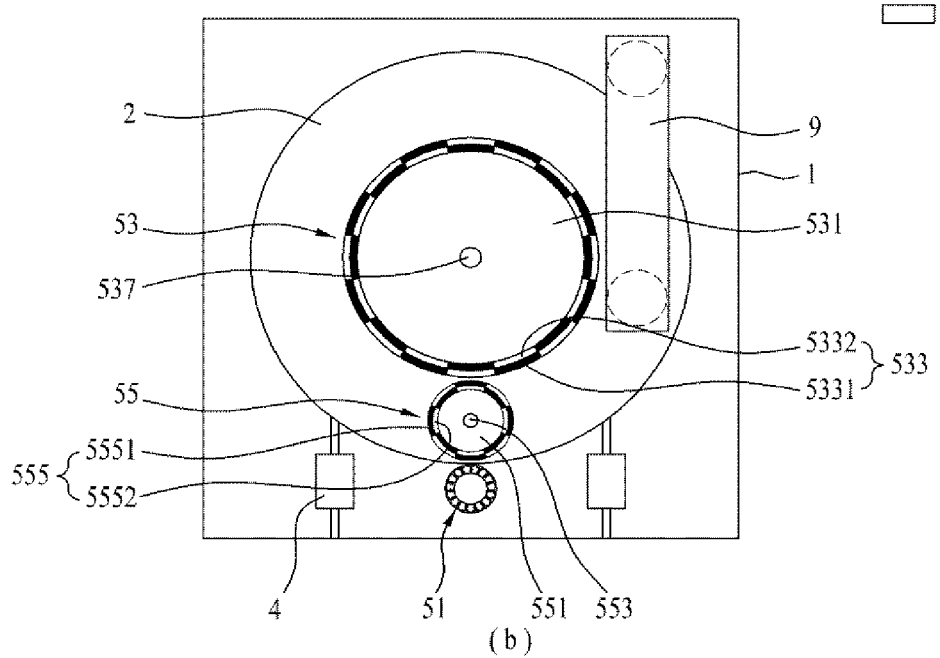

[Fig. 15]
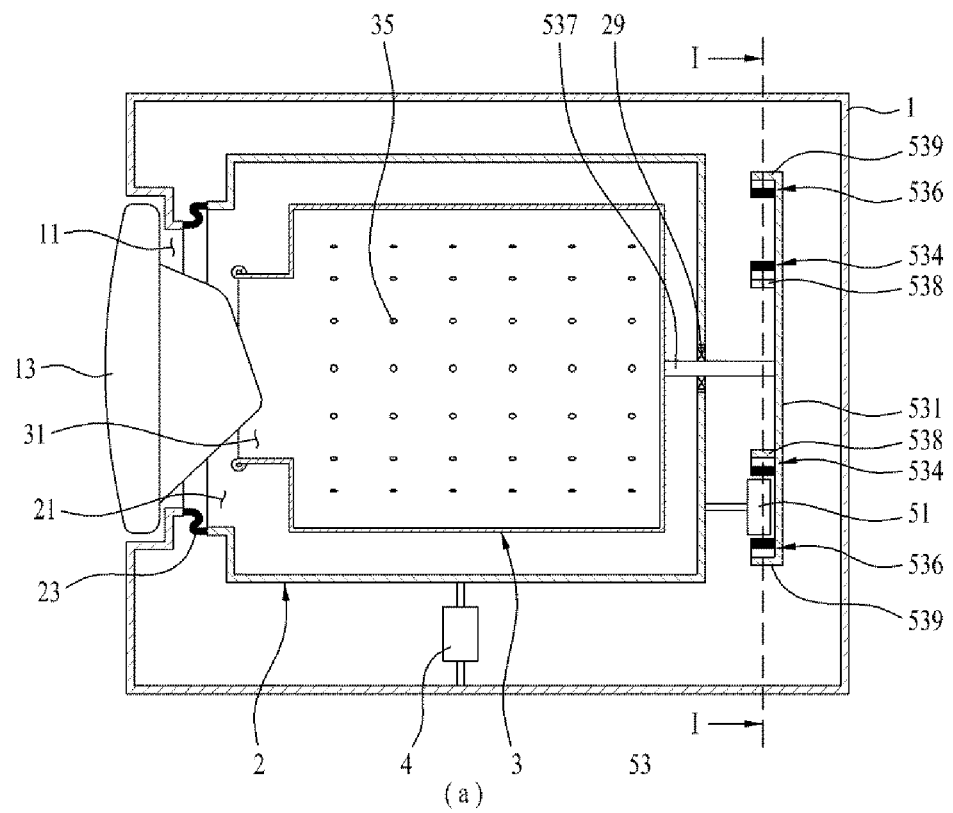
(a)
■ : N
□ : S
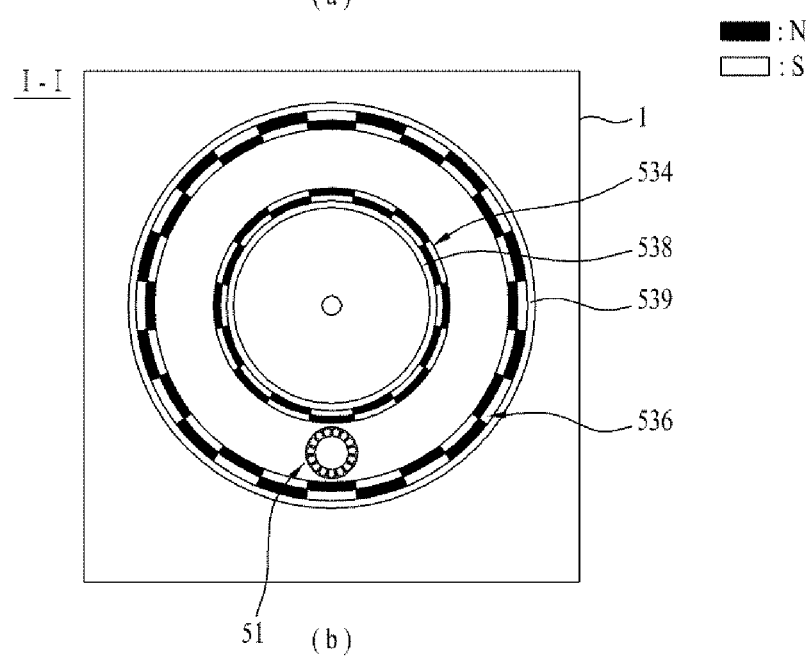
(b)

[Fig. 16]
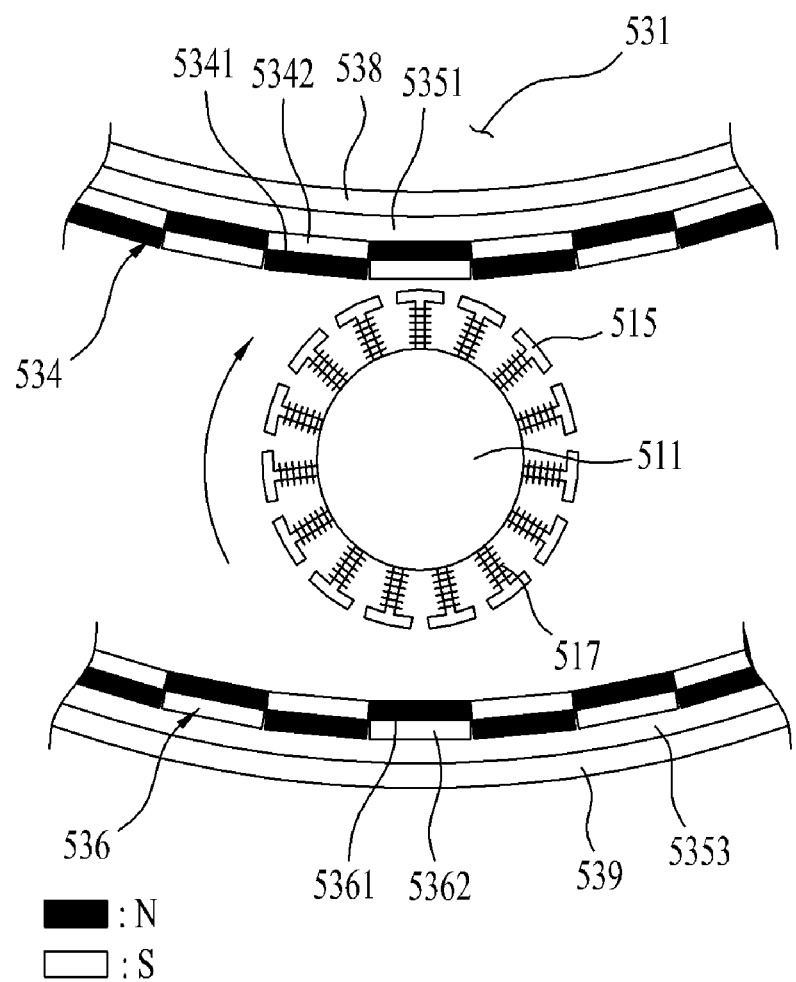

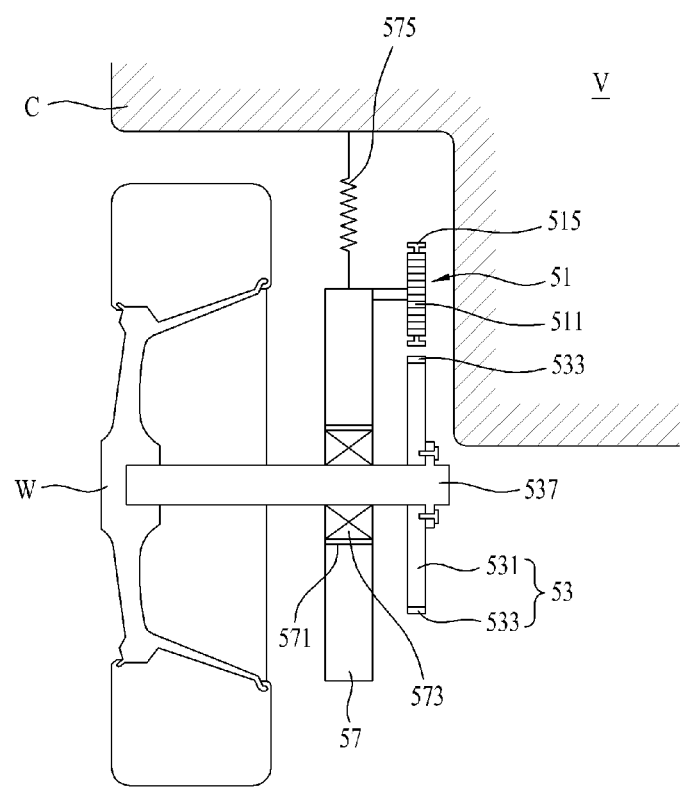
[Fig. 17]

POWER GENERATING DEVICE AND APPARATUS HAVING THE SAME

CROSS-REFERENCE TO RELATED PATENT APPLICATIONS

This application is a U.S. National Stage Application under 35 U.S.C. § 371 of PCT Application No. PCT/KR2014/005528, filed Jun. 23, 2014, which claims priority to Korean Patent Application Nos. 10-2013-0073084, filed Jun. 25, 2013, 10-2013-0127809, filed Oct. 25, 2013, 10-2014-0041133, filed Apr. 7, 2014 and 10-2014-0041134, filed Apr. 7, 2014 whose entire disclosures are hereby incorporated by reference.

TECHNICAL FIELD

The present invention relates to a power generating device, a clothes treatment apparatus having the power generating device and a vehicle having the power generating device.

BACKGROUND ART

A clothes treatment apparatus refers to an apparatus that washes laundry using friction between a drum and laundry and friction between laundry and wash water by rotating the drum placed in a tub, or an apparatus that dries laundry stored in a drum.

A conventional clothes treatment apparatus includes a cabinet forming an external appearance, a tub installed in the cabinet, a drum rotatably installed in the tub to wash laundry received therein and a power generating device to rotate the drum.

Meanwhile, the power generating device generally rotates the drum using a direct drive method or a belt pulley method.

The direct drive method employs a stator fixed to a rear surface of the tub, a rotating shaft penetrating the tub and connected to the drum and a rotor to which the rotating shaft is fixed, the rotor being rotated by a magnetic field generated by the stator. The belt pulley method is a method to rotate a pulley, coupled to a rotating shaft that penetrates the tub and is connected to the drum, using the power generating device via a belt.

In the case of the clothes treatment apparatus in which the drum is rotated using the belt pulley method, change in a rotation direction of the drum or sudden braking of the drum is difficult and the belt causes noise generation.

In the case of the direct drive method, vibration of the power generating device is transmitted to the tub and generates noise.

In addition, the power generating device used in the direct drive method must have a great capacity to apply large torque to the drum. However, the great capacity of the power generating device increases power loss (efficiency deterioration) and the volume of the power generating device.

Meanwhile, some power generating devices usable with the clothes treatment apparatus may include a planetary gear, which contributes to reduction in volume of the power generating device and provides large torque to the drum.

However, the power generating device using the planetary gear suffers from low efficiency, generation of noise or vibration and a complicated configuration (an increased number of constituent elements) because power provided by a sun gear is transmitted to the rotating shaft of the drum through the planetary gear.

DISCLOSURE OF INVENTION

Technical Problem

Therefore, the present invention has been made in view of the above problems, and it is an object of the present invention to provide a power generating device which may achieve high efficiency and reduced noise and vibration, a clothes treatment apparatus having the power generating device and a vehicle having the power generating device.

It is another object of the present invention to provide a power generating device which may prevent generation of overload, a clothes treatment apparatus having the power generating device and a vehicle having the power generating device.

It is another object of the present invention to provide a clothes treatment apparatus having a power generating device which may reduce load in a height direction of a drum.

It is a further object of the present invention to provide a clothes treatment apparatus which may minimize deterioration in the durability of a device to support a rotating shaft of a drum via reduction of load in a height direction of the drum and a device to seal the rotating shaft of the drum.

Solution to Problem

In accordance with one aspect of the present invention, the above and other objects can be accomplished by the provision of a power generating device including a magnetic field producer configured to produce a rotating magnetic field, a power transmitter configured to be rotated by the rotating magnetic field provided by the magnetic field producer and an output unit coupled to an object to be rotated, the output unit serving to rotate the object to be rotated using magnetic force provided by the power transmitter.

The power generating device may further include a support member to which the magnetic field producer is fixed and the power transmitter is rotatably coupled, the support member being separated from the output unit.

The output unit may include an output unit body separated from the support member, an output shaft fixed to the output unit body, the output shaft being connected to the object to be rotated, and an output magnetic unit fixed to the output unit body, and the power transmitter may include a transmitter body rotatably coupled to the support member, the transmitter body being located between the output magnetic unit and the magnetic field producer, and a transmitter magnetic unit fixed to the transmitter body, the transmitter magnetic unit providing the output magnetic unit with magnetic force to rotate the output unit body.

One end of the output shaft may be connected to the object to be rotated and the other end of the output shaft may be rotatably coupled to the support member.

The output unit body may include a disc-shaped base and a flange protruding from a circumferential surface of the base to support the output magnetic unit, the transmitter body may have a disc shape and the transmitter magnetic unit may be arranged on a circumferential surface of the transmitter body.

The output magnetic unit may include a plurality of permanent magnets fixed to the flange such that N-poles and S-poles are alternately exposed, and the transmitter magnetic unit may include a plurality of permanent magnets fixed to the circumferential surface of the transmitter body such that N-poles and S-poles are alternately exposed.

The output magnetic unit may include a plurality of permanent magnets fixed to the flange such that N-poles and S-poles are alternately exposed, and the transmitter magnetic unit may include a plurality of permanent magnets spaced apart from one another by a predetermined distance and fixed to the circumferential surface of the transmitter body such that only N-poles or S-poles are exposed.

The output magnetic unit may include a plurality of permanent magnets spaced apart from one another by a predetermined distance and fixed to the flange such that only N-poles or S-poles are exposed, and the transmitter magnetic unit may include a plurality of permanent magnets arranged on the circumferential surface of the transmitter body such that N-poles and S-poles are alternately exposed.

The power generating device may further include an output magnetic force amplifying unit provided at the flange to support the output magnetic unit, the output magnetic force amplifying unit serving to amplify magnetic force of the output magnetic unit, and/or a transmitter magnetic force amplifying unit provided at the circumferential surface of the transmitter body to support the transmitter magnetic unit, the transmitter magnetic force amplifying unit serving to amplify magnetic force of the transmitter magnetic unit.

In accordance with another aspect of the present invention, there is provided a vehicle including a support member connected to a chassis, a magnetic field producer fixed to the support member to produce a rotating magnetic field, a power transmitter rotatably coupled to the support member, the power transmitter being rotated by the rotating magnetic field provided by the magnetic field producer, and an output unit configured to rotate an output shaft connected to a wheel using magnetic force provided by the power transmitter. The support member may be connected to the chassis via a vibration attenuating device.

In accordance with another aspect of the present invention, there is provided a power generating device including an output unit including an output unit body connected to an object to be rotated via an output shaft and a plurality of output magnetic units arranged in a circumferential direction of the output unit body such that magnetic poles are alternately exposed, a magnetic field producer configured to produce a rotating magnetic field when current is supplied thereto, a power transmitter including a transmitter body rotatably located between the output magnetic unit and the magnetic field producer and a transmitter magnetic unit arranged on a circumferential surface of the transmitter body such that magnetic poles are alternately exposed, the transmitter magnetic unit serving to transmit power provided by the magnetic field producer to the output magnetic unit, and a magnetic force induction unit including a first magnetic force inducer serving to induce magnetic force generated by the transmitter magnetic unit to the output magnetic unit, and/or a second magnetic force inducer provided between the magnetic field producer and the transmitter magnetic unit to induce magnetic force generated by the magnetic field producer to the transmitter magnetic unit.

The first magnetic force inducer may include a reference magnetic substance fixed to the output unit body to face the transmitter magnetic unit located at the shortest distance from the output magnetic unit, and one or more sub magnetic substances located respectively between one transmitter magnetic unit and one output magnetic unit having a corresponding arrangement order on the basis of each of the transmitter magnetic unit and the output magnetic unit.

The reference magnetic substance and the sub magnetic substances may be spaced apart from one another by a predetermined distance.

The sub magnetic substances may be symmetrically located about a straight line, the straight line passing a symmetrical axis of the reference magnetic substance.

The reference magnetic substance and the sub magnetic substances may be a stack of plural metal plates, and one metal plate and another metal plate may be separated from each other by a non-magnetic substance.

Each of the reference magnetic substance and the sub magnetic substances may include a non-magnetic substance fixed to the output unit body, a metal plate fixed to the non-magnetic substance and a non-magnetic substance fixed to the metal plate.

The magnetic field producer may include a body fixed in the cabinet, the body being a magnetic substance, a plurality of protrusions radially protruding from a circumferential surface of the body, and a coil unit including at least two coils configured to receive alternating current from an external power source, each coil being fixed to different protrusions among the protrusions.

The second magnetic force inducer may include a reference magnetic substance fixed to the output unit body to correspond to the transmitter magnetic unit located at the shortest distance from the protrusions, and a sub magnetic substance located between one protrusion and one transmitter magnetic unit having a corresponding arrangement order on the basis of each of the protrusion and the transmitter magnetic unit located at positions corresponding to the reference magnetic substance.

The first magnetic force inducer may include a first magnetic substance located between one transmitter magnetic unit and one output magnetic unit of the shortest distance among the transmitter magnetic units and the output magnetic units, and one or more second magnetic substances located respectively between one transmitter magnetic unit and one output magnetic unit having a corresponding arrangement order on the basis of each of the transmitter magnetic unit and the output magnetic unit with the first magnetic substance interposed therebetween. The second magnetic force inducer may include a third magnetic substance located between one protrusion and one transmitter magnetic unit of the shortest distance among the protrusions and the transmitter magnetic units and one or more fourth magnetic substances located respectively between one protrusion and one transmitter magnetic unit having a corresponding arrangement order on the basis of each of the protrusion and the transmitter magnetic unit located at positions corresponding to the third magnetic substance.

In accordance with another aspect of the present invention, there is provided a clothes treatment apparatus including a cabinet having an opening for introduction/removal of laundry, a drum rotatably placed in the cabinet to store laundry therein, the drum having a drum opening communicating with the opening, a magnetic field producer configured to produce a rotating magnetic field, a power transmitter configured to be rotated by the rotating magnetic field provided by the magnetic field producer and an output unit configured to transmit torque provided by the power transmitter to the drum so as to rotate the drum.

The clothes treatment apparatus may further include a tub placed in the cabinet to provide a space in which the drum is received, the magnetic field producer may be fixed to the tub, the output unit may rotate an output shaft, the output shaft penetrating the tub and being connected to the drum, and the power transmitter may be rotatably coupled to the tub, the power transmitter being located between the magnetic field producer and the output unit.

The output unit may include an output unit body fixed to the output shaft and an output magnetic unit fixed to the output unit body, and the power transmitter may include a transmitter body rotatably coupled to the tub, the transmitter body being located between the output magnetic unit and the magnetic field producer, and a transmitter magnetic unit fixed to the transmitter body, the transmitter magnetic unit providing the output magnetic unit with magnetic force to rotate the output unit body.

The output unit body and the transmitter body may have a disc shape, the output magnetic unit may include a plurality of permanent magnets arranged on a circumferential surface of the output unit body such that N-poles and S-poles are alternately exposed, and the transmitter magnetic unit may include a plurality of permanent magnets arranged on a circumferential surface of the transmitter body such that N-poles and S-poles are alternately exposed.

The output unit body and the transmitter body may have a disc shape, the output magnetic unit may include a plurality of permanent magnets arranged on a circumferential surface of the output unit body such that N-poles and S-poles are alternately exposed, and the transmitter magnetic unit may include a plurality of permanent magnets spaced apart from one another by a predetermined distance along a circumferential surface of the transmitter body such that only N-poles or S-poles are exposed.

The output unit body and the transmitter body may have a disc shape, the output magnetic unit may include a plurality of permanent magnets spaced apart from one another by a predetermined distance along a circumferential surface of the output unit body such that only N-poles or S-poles are exposed, and the transmitter magnetic unit may include a plurality of permanent magnets arranged on a circumferential surface of the transmitter body such that N-poles and S-poles are alternately exposed.

The clothe treatment apparatus may further include a first magnetic force inducer configured to induce magnetic force generated by the transmitter magnetic unit to the output magnetic unit, and/or a second magnetic force inducer located between the magnetic field producer and the transmitter magnetic unit to induce magnetic force generated by the magnetic field producer to the transmitter magnetic unit.

The first magnetic force inducer may include a reference magnetic substance fixed to the output unit body to face the transmitter magnetic unit located at the shortest distance from the output magnetic unit and one or more sub magnetic substances located respectively between one transmitter magnetic unit and one output magnetic unit having a corresponding arrangement order on the basis of each of the transmitter magnetic unit and the output magnetic unit with the reference magnetic substance interposed therebetween.

The reference magnetic substance and the sub magnetic substances may be spaced apart from one another by a predetermined distance.

The sub magnetic substances may be symmetrically located about a straight line, the straight line passing a symmetrical axis of the reference magnetic substance.

Each of the reference magnetic substance and the sub magnetic substances may be a stack of plural metal plates and one metal plate and another metal plate may be separated from each other by a non-magnetic substance.

Each of the reference magnetic substance and the sub magnetic substances may include a non-magnetic substance fixed to the output unit body, a metal plate fixed to the non-magnetic substance and a non-magnetic substance fixed to the metal plate.

The magnetic field producer may include a body fixed in the cabinet, the body being a magnetic substance, a plurality of protrusions radially protruding from a circumferential surface of the body and a coil unit including at least two coils configured to receive alternating current from an external power source, each coil being fixed to different protrusions among the protrusions.

The second magnetic force inducer may include a reference magnetic substance fixed to the output unit body to face the transmitter magnetic unit located at the shortest distance from the protrusions and a sub magnetic substance located between one protrusion and one transmitter magnetic unit having a corresponding arrangement order on the basis of each of the protrusion and the transmitter magnetic unit located at positions corresponding to the reference magnetic substance.

The clothes treatment apparatus may further include an output magnetic force amplifying unit provided at the output unit body to amplify magnetic force of the output magnetic unit, and/or a transmitter magnetic force amplifying unit provided at the transmitter body to amplify magnetic force of the transmitter magnetic unit.

The output magnetic force amplifying unit may include a metal fixed to the output unit body to support the output magnetic unit, and the transmitter magnetic force amplifying unit may include a metal fixed to the transmitter body to support the transmitter magnetic unit.

The clothes treatment apparatus may further include a front support member placed in the cabinet to rotatably support the drum opening, the front support member having a through-hole communicating with the opening and a rear support member placed in the cabinet, the magnetic field producer may be fixed to the rear support member, the output unit may include an output shaft penetrating the rear support member to thereby be connected to the drum, an output unit body fixed to the output shaft and an output magnetic unit fixed to the output unit body, and the power transmitter may include a transmitter body rotatably coupled to the rear support member, the transmitter body being located between the magnetic field producer and the output magnetic unit, and a transmitter magnetic unit fixed to the transmitter body, the transmitter magnetic unit providing the output magnetic unit with magnetic force.

The clothes treatment apparatus may further include a front support member placed in the cabinet to rotatably support the drum opening, the front support member having a through-hole communicating with the opening, the magnetic field producer may be fixed to the cabinet, the output unit may include an output shaft rotatably installed to the cabinet to thereby be connected to the drum, an output unit body fixed to the output shaft and an output magnetic unit fixed to the output unit body, and the power transmitter may include a transmitter body rotatably coupled to the cabinet, the transmitter body being located between the magnetic field producer and the output magnetic unit, and a transmitter magnetic unit fixed to the transmitter body, the transmitter magnetic unit providing the output magnetic unit with magnetic force.

In accordance with another aspect of the present invention, there is provided a power generating device including an output unit including a disc-shaped output unit body, an output shaft connecting an object to be rotated and the output unit body to each other and an output magnetic unit arranged on a circumferential surface of the output unit body such that N-poles and S-poles are alternately arranged, and a magnetic field producer configured to produce a rotating magnetic field and to provide the output magnetic unit with the rotating magnetic field so as to rotate the output unit body, wherein the magnetic field producer is eccentrically located from the output shaft.

In accordance with another aspect of the present invention, there is provided a vehicle including a wheel, a chassis, a support member connected to the chassis, an output unit including a disc-shaped output unit body, an output shaft penetrating the support member to thereby connect the wheel and the output unit body to each other and an output magnetic unit arranged on a circumferential surface of the output unit body such that N-poles and S-poles are alternately arranged, and a magnetic field producer configured to produce a rotating magnetic field and to provide the output magnetic unit with the rotating magnetic field, the magnetic field producer being eccentrically located from the output shaft.

In accordance with a further aspect of the present invention, there is provided a clothes treatment apparatus including a cabinet having an opening for introduction/removal of laundry, a drum rotatably placed in the cabinet to store laundry therein, the drum having a drum opening communicating with the opening, an output unit including an output shaft connected to the drum, a disc-shaped output unit body fixed to the output shaft and an output magnetic unit arranged on a circumferential surface of the output unit body such that N-poles and S-poles are alternately exposed, and a magnetic field producer configured to produce a rotating magnetic field so as to rotate the output unit, wherein the magnetic field producer has a smaller diameter than a diameter of the output unit body and is eccentrically located from the output shaft.

The output unit may further include an output magnetic force amplifying unit provided on a circumferential surface of the output unit body to support the output magnetic unit, the output magnetic force amplifying unit serving to amplify magnetic force of the output magnetic unit.

The clothes treatment apparatus may further include a power transmitter rotatably placed between the output magnetic unit and the magnetic field producer, the power transmitter transmitting the rotating magnetic field (or rotation power) provided by the magnetic field producer to the output magnetic unit.

The clothes treatment apparatus may further include a tub placed in the cabinet, the tub being configured to receive the drum therein, the output shaft may penetrate the tub to connect the drum and the output unit body to each other, the magnetic field producer may be fixed to the cabinet or the tub, and the power transmitter may be rotatably coupled to the cabinet or the tub and located between the output magnetic field unit and the magnetic field producer.

The power transmitter may include a transmitter body rotatably coupled to the tub or the cabinet and located between the output unit body and the magnetic field producer, and a transmitter magnetic unit arranged on a circumferential surface of the transmitter body such that N-poles and S-poles are alternately arranged.

The output unit body may include a first flange protruding from a surface of the output unit body and a second flange protruding from the surface of the output unit body, the second flange having a larger diameter than a diameter of the first flange, the output magnetic unit may include a first flange magnetic unit provided on an outer circumferential surface of the first flange such that N-poles and S-poles are alternately exposed and a second flange magnetic unit arranged on an inner circumferential surface of the second flange such that N-poles and S-poles are alternately exposed, and the magnetic field producer may be located between the first flange magnetic unit and the second flange magnetic unit.

The clothes treatment apparatus may further include a tub placed in the cabinet, the tub being configured to receive the drum therein, the output shaft may penetrate the tub to connect the drum and the output unit body to each other, and the magnetic field producer may be fixed to the cabinet or the tub.

The first flange and the second flange may protrude from a surface of the output unit body toward the tub and the magnetic field producer may be fixed to the tub and located between the first flange magnetic unit and the second flange magnetic unit.

The first flange and the second flange may protrude from the surface of the output unit body in a direction opposite to the tub and the magnetic field producer may be fixed to the cabinet and located between the first flange magnetic unit and the second flange magnetic unit.

The output unit may include a first magnetic force amplifying unit provided at the first flange to support the first flange magnetic unit, the first magnetic force amplifying unit serving to amplify magnetic force of the first flange magnetic unit, and/or a second magnetic force amplifying unit provided at the second flange to support the second flange magnetic unit, the second magnetic force amplifying unit serving to amplify magnetic force of the second flange magnetic unit.

Advantageous Effects of Invention

The present invention has the effect of providing a power generating device which may achieve high efficiency and reduced noise and vibration, a clothes treatment apparatus having the power generating device and a vehicle having the power generating device.

Further, the present invention has the effect of providing a power generating device which may prevent generation of overload, a clothes treatment apparatus having the power generating device and a vehicle having the power generating device.

Furthermore, the present invention has the effect of providing a clothes treatment apparatus having a power generating device which may reduce load in a height direction of a drum.

In addition, the present invention has the effect of providing a clothes treatment apparatus which may minimize deterioration in the durability of a device to support a rotating shaft of a drum via reduction of load in a height direction of the drum and a device to seal the rotating shaft of the drum.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIGS. 1 to 3 show a power generating device according to one embodiment of the present invention;

FIGS. 4 and 5 show one embodiment of a clothes treatment apparatus having the power generating device according to the present invention;

FIGS. 6 and 7 show other embodiments of a clothes treatment apparatus having the power generating device according to the present invention;

FIG. 8 shows one embodiment of a vehicle having the power generating device according to the present invention;

FIGS. 9 and 10 show a power generating device according to a second embodiment of the present invention;

FIG. 11 shows one embodiment of a clothes treatment apparatus having the power generating device of FIG. 9;

FIGS. 12 and 13 show a power generating device according to a third embodiment of the present invention;

FIG. 14 shows a power generating device according to a fourth embodiment of the present invention;

FIGS. 15 and 16 show a power generating device according to a fifth embodiment of the present invention; and FIG. 17 shows one embodiment of a vehicle having the power generating device of FIG. 12.

BEST MODE FOR CARRYING OUT THE INVENTION

Figure 1:
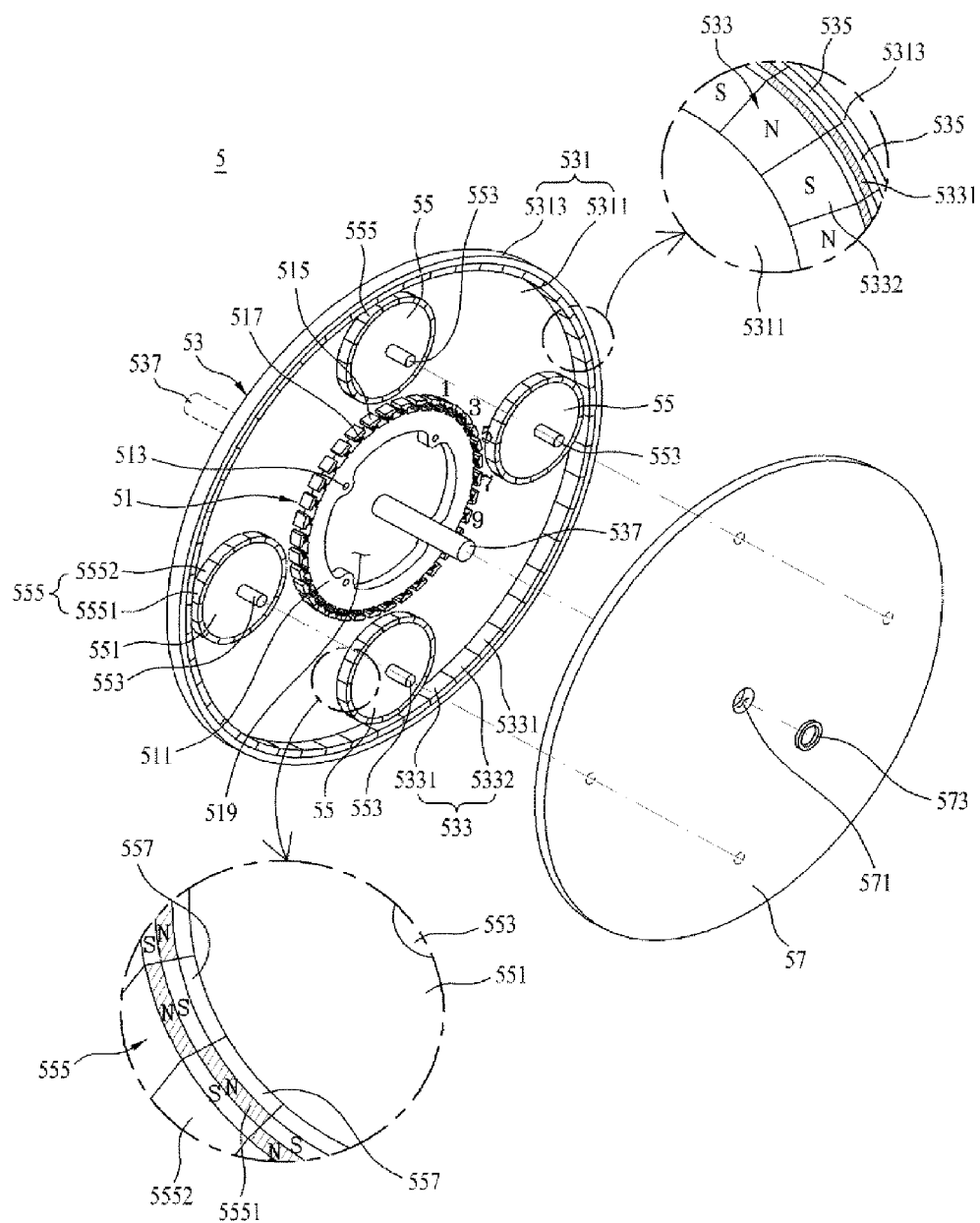

Hereinafter, preferred embodiments of the present invention will be described in detail with reference to the accompanying drawings. Meanwhile, a configuration or a control method of an apparatus that will be described hereinafter is provided for explanation of the embodiments of the present invention, and is not intended to limit a technical range of the present invention. The same reference numerals of the entire specification designate the same constituent elements.

As exemplarily shown in FIG. 1, a power generating device 5 of the present invention may include a magnetic field producer 51 to produce a rotating magnetic field, a power transmitter 55 configured to be rotated by the rotating magnetic field provided by the magnetic field producer 51 and an output unit 53 configured to be rotated by magnetic force provided by the power transmitter 55 to transmit torque thereof to an object to be rotated.

The magnetic field producer 51 and the power transmitter 55 are installed to a support member 57 that is separated from the output unit 53. The magnetic field producer 51 is fixed to the support member 57 and the power transmitter 55 is rotatably coupled to the support member 57. In addition, a circumferential surface of the power transmitter 55 may be spaced apart from a circumferential surface of the magnetic field producer 51 by a predetermined distance.

The support member 57 may have any shape so long as it supports the magnetic field producer 51 and the power transmitter 55. The support member 57 may be omitted according to a configuration of an apparatus incorporating the power generating device 5.

The magnetic field producer 51 serves to produce a rotating magnetic field using two phase alternating current or three phase alternating current supplied from a power source.

Figure 2:
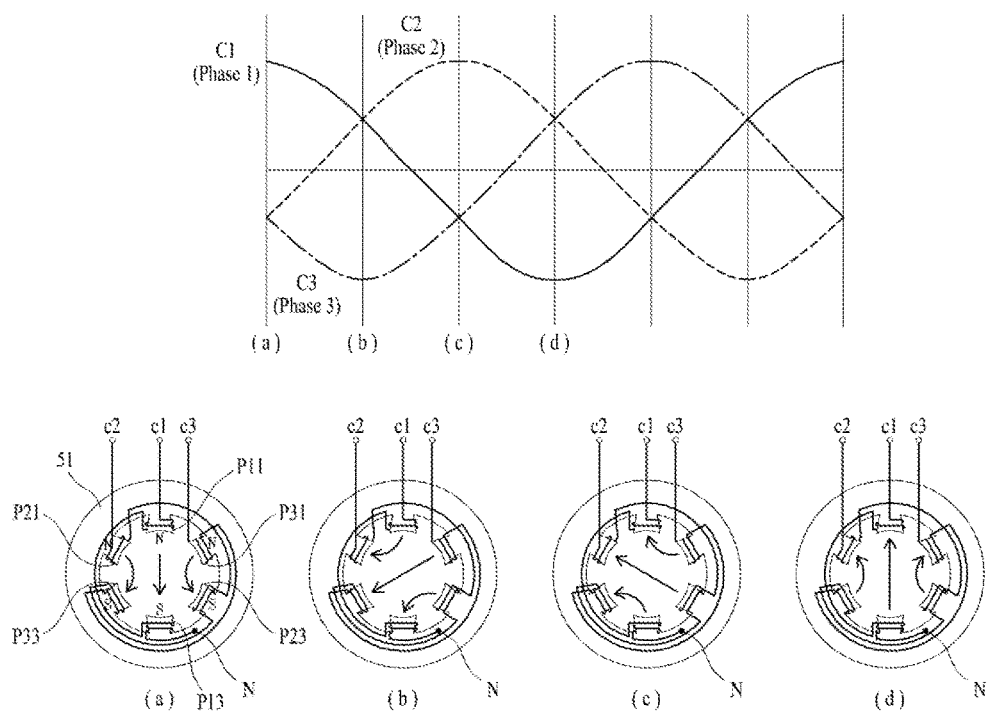

FIG. 2 shows a configuration of the magnetic field producer 51 that produces a rotating magnetic field using three phase alternating current and a rotating magnetic field creating procedure in brief. Hereinafter, the principle of creating a rotating magnetic field by the magnetic field producer 51 of FIG. 2 will first be described with reference to FIG. 2.

The magnetic field producer 51 exemplarily shown in FIG. 2 includes three pairs of protrusions (i.e. a first protrusion pair, a second protrusion pair and a third protrusion pair).

The first protrusion pair includes a first protrusion P11 and a second protrusion P13 arranged to face each other about the center of the magnetic field producer 51, the second protrusion pair includes a third protrusion P21 and a fourth protrusion P23 arranged to face each other about the center of the magnetic field producer 51, and the third protrusion pair includes a fifth protrusion P31 and a sixth protrusion P33 arranged to face each other about the center of the magnetic field producer 51.

In addition, the first to sixth protrusions P11, P13, P21, P23, P31 and P33 are spaced apart from one another by the same interval (60 degrees).

A single coil is wound around the respective protrusions facing each other of each protrusion pair in the same direction. That is, a first coil C1 is wound around the first protrusion pair P11 and P13, a second coil C2 is wound around the second protrusion pair P21 and P23 and a third coil C3 is wound around the third protrusion pair P31 and P33.

In this case, a winding direction of the first coil C1 must be equal in the first protrusion P11 and the second protrusion P13, a winding direction of the second coil C2 must be equal in the third protrusion P21 and the fourth protrusion P23, and a winding direction of the third coil C3 must be equal in the fifth protrusion P31 and the sixth protrusion P33.

In addition, the respective coils are coupled to one another at nodes N.

In the magnetic field producer 51 having the above-described configuration, when three phase alternating current is supplied to the respective coils at a constant phase difference, the magnitude of current supplied through the first coil C1 becomes the maximum at a point in time (a), thus causing the magnetic field producer 51 to produce a magnetic field directed from the first protrusion P11 to the second protrusion P13.

Meanwhile, the magnetic field produced between the first protrusion P11 and the second protrusion P13 causes creation of a magnetic field directed from the fifth protrusion P31 to the fourth protrusion P23 and creation of a magnetic field directed from the third protrusion P21 to the sixth protrusion P33.

The magnitude of current supplied through the third coil C3 becomes the maximum at a point in time (b), thus causing the magnetic field producer 51 to produce a magnetic field directed from the fifth protrusion P31 to the sixth protrusion P33. The magnitude of current supplied through the second coil C2 becomes the maximum at a point in time (c), thus causing the magnetic field producer 51 to produce a magnetic field directed from the fourth protrusion P23 to the third protrusion P21.

Thereby, the magnetic field may be rotated clockwise by 120 degrees during a transition period from the point in time (a) to the point in time (c). Through the above-described process, the magnetic field producer 51 produces a rotating magnetic field.

Although FIG. 1 shows the magnetic field producer 51 having a greater number of protrusions 515 than that shown in FIG. 2, the magnetic field producer 51 may achieve effects as described with reference to FIG. 2 so long as it has a configuration that will be described below.

The magnetic field producer 51 (e.g., a stator) shown in FIG. 1 includes a body 511 fixed to the support member 57, a plurality of protrusions 515 arranged on a circumferential surface of the body 511 and a coil unit 517 wound around the protrusions 515.

The body 511 is a magnetic substance in the form of a disc or a cylinder. The body 511 may have coupling holes 513 into which fastening means, such as bolts, are inserted, and a body through-hole 519 perforated in the center of the body 511.

As such, the body 511 may be fixed and fastened to the support member 57 by the fastening means inserted into the coupling holes 513.

Meanwhile, a first coil, a second coil and a third coil are wound around the protrusions 515 arranged on the circumferential surface of the body 511 in the following manner.

Assuming that protrusions located in the clockwise or counterclockwise direction from a protrusion No. 1 are numbered a protrusion No. 2, a protrusion No. 3, . . . a protrusion No. 3n, the first coil is wound around protrusions Nos. 3n−2 (where, n is ≥1), such as the protrusion No. 1, a protrusion No. 4 and a protrusion No. 7. In this case, the first coil must be wound around the respective protrusions in the same direction.

Meanwhile, the second coil is wound around protrusions Nos. 3n−1, such as the protrusion No. 2, a protrusion No. 5, and a protrusion No. 8 (the second coil being wound around the respective protrusions in the same direction), and the third coil is wound around protrusions Nos. 3n, such as the protrusion No. 3, a protrusion No. 6 and a protrusion No. 9 (the third coil being wound around the respective protrusions in the same direction).

Here, note that the two coils among the first coil, the second coil and the third coil must be wound around the respective protrusions in a direction different from a winding direction of the other coil wound around the respective protrusions.

Meanwhile, the output unit 53 included in the power generating device 5 according to the present invention may include an output shaft 537 coupled to an object to be rotated (e.g., a drum of a clothes treatment apparatus or a wheel of a vehicle), an output unit body 531 fixed to the output shaft 537, the output unit body 531 being configured to surround the circumferential surface of the magnetic field producer body 511 and an output magnetic unit 533 attached to the output unit body 531.

The output unit body 531 may include a disc-shaped base 5311 fixed to the output shaft 537 and a flange 5313 extending from a circumferential surface of the base 5311 toward the support member 57 to surround the circumferential surface of the magnetic field producer body 511.

A protruding direction of the output shaft 537 fixed to the base 5311 must be determined according to a position of the object to be rotated.

When the support member 57 is located between the object to be rotated and the output unit body 531, one end of the output shaft 537 is fixed to the base 5311 and the other end of the output shaft 537 penetrates the support member 57.

In this case, the output shaft 537 passes the body through-hole 519 of the magnetic field producer 51 and is connected to the support member 57. As such, the output shaft 537 does not interfere with the magnetic field producer body 511.

In addition, to rotatably support the output shaft 537, the support member 57 may include a support member through-hole 571 for penetration of the output shaft 537 and a bearing 573 fitted into the support member through-hole 571 to rotatably support the output shaft 537.

On the other hand, when the output unit body 531 is interposed between the object to be rotated and the support member 57, the output shaft 537 must protrude from the base 5311 in a direction opposite to the support member 57 (as shown by a dotted line).

Note that the output shaft 537 may have one end penetrating the support member 57 (rotatably supported by the support member 57) and the other end penetrating the base 5311 (fixed to the base 5311) as needed.

The output magnetic unit 533 may include permanent magnets fixed to the flange 5313 so as to face the magnetic field producer 51.

The output magnetic unit 533 may be arranged on an inner circumferential surface of the flange 5313 such that N-poles (first magnetic poles 5331) and S-poles (second magnetic poles 5332) are alternately exposed.

Note that the permanent magnets of the output magnetic unit 533 may be spaced apart from one another by a predetermined distance along the inner circumferential surface of the flange 5313 such that the N-poles 5331 or the S-poles 5332 of the permanent magnets are exposed to the power transmitter 55.

Meanwhile, the output unit 53 may further include an output magnetic force amplifying unit 535 to amplify magnetic force of the output magnetic unit 533.

As exemplarily shown in FIG. 3, it can be appreciated based on experimental results that, when a metal, such as iron, is located at any one surface of an N-pole and a S-pole of a permanent magnet, the other magnetic pole not facing the metal exerts increased magnetic force.

That is, as can be appreciated from the drawing, in the case of a bar-shaped permanent magnet, magnetic forces of respective magnetic poles are 295 mT and 287 mT. However, when a metal is located at the S-pole, magnetic force of the N-pole is increased to 330 mT and magnetic force of the S-pole is reduced to 97 mT.

In addition, as can be appreciated from the drawing, the above-described method is available to increase magnetic force of the N-pole of a single magnet, although the increased magnetic force of the N-pole is less than magnetic force (381 mT) acquired by overlapping two magnets.

Meanwhile, as can be appreciated from FIG. 3, even in the case of a cylindrical magnet, magnetic force of an N-pole is increased from 463 mT to 500 mT and magnetic force of an S-pole is reduced from 462 mT to 245 mT when a metal is located at the S-pole.

The output magnetic force amplifying unit 535 as exemplarily shown in FIG. 1 serves to increase magnetic force of the output magnetic unit 533 using a phenomenon as appreciated from FIG. 3.

More specifically, the output magnetic force amplifying unit 535 serves to amplify magnetic force of some magnetic poles exposed to the power transmitter 55 among the magnetic poles of the output magnetic unit 533 fixed to the flange 5313. The output magnetic force amplifying unit 535 may be formed of a metal (in the form of a bar or a cylinder) fixed to the flange 5313 to support the output magnetic unit 533.

In the present invention, through provision of the output magnetic force amplifying unit 535, the output unit 53 may be constructed using permanent magnets having low magnetic force, which has the effects of reducing manufacturing costs of the power generating device 5 and ensuring stable rotation of the object to be rotated.

In addition, through reduction in the magnetic force of some magnetic poles (i.e. the magnetic poles of the output magnetic unit 533 fixed to the output magnetic force amplifying unit 535) not exposed to the power transmitter 55 among the magnetic poles of the output magnetic unit 533, malfunction of an electronic device included in a clothes treatment apparatus or a vehicle having the power generating device 5 of the present invention may be minimized.

Meanwhile, the power transmitter 55 according to the present invention serves to transmit rotation power provided by the magnetic field producer 51 to the output magnetic unit 533.

The power transmitter 55 includes a transmitter body 551 rotatably coupled to the support member 57 and located between the output magnetic unit 533 and the protrusions 515 and a transmitter magnetic unit 555 coupled to the transmitter body 551.

The transmitter body 551 may be rotatably coupled to the support member 57 via a transmitter rotating shaft 553.

Although FIG. 1 shows the case in which four power transmitters (55, spaced apart from one another by 90 degrees) are rotatably coupled to the support member 57 by way of example, the number of the power transmitters 55 may be below 4 or may be 5 or more as needed.

The transmitter magnetic unit 555 may include a plurality of permanent magnets arranged on a circumferential surface of the disc-shaped transmitter body 551.

In this case, the transmitter magnetic unit 555 may be arranged on the circumferential surface of the transmitter body 551 such that N-poles (first magnetic poles 5551) and S-poles (second magnetic poles 5552) of the permanent magnets are alternately exposed.

Note that the permanent magnets of the transmitter magnetic unit 555 may be spaced apart from one another by a predetermined distance along an inner circumferential surface of the transmitter body 551 such that only N-poles 5551 or S-poles 5552 of the permanent magnets are exposed to the magnetic field producer 51 (for reduction of manufacturing costs).

Meanwhile, the transmitter magnetic unit 555 must be positioned so as not to come into contact with not only the protrusions 515 of the magnetic field producer 51, but also the output magnetic unit 533.

That is, the transmitter magnetic unit 555 may be arranged on the circumferential surface of the transmitter body 551 to maintain a constant distance with the protrusions 515 and the output magnetic unit 533.

In addition, the power transmitter 55 may further include a transmitter magnetic force amplifying unit 557 to amplify magnetic force of the transmitter magnetic unit 555.

The transmitter magnetic force amplifying unit 557 serves to increase magnetic force of some magnetic poles exposed to the magnetic field producer 51 among the magnetic poles of the transmitter magnetic unit 555 fixed to the transmitter body 551. The transmitter magnetic force amplifying unit 557 may be formed of a metal fixed to the transmitter body 551 to support the transmitter magnetic unit 555.

The power generating device 5 having the above-described configuration has an operating procedure as follows.

When current is supplied to the magnetic field producer 51, the magnetic field producer 51 produces a rotating magnetic field. The transmitter magnetic unit 555 of the power transmitter 55 is arranged under the influence of the rotating magnetic field, thus causing rotation of the transmitter body 551.

Through rotation of the transmitter magnetic unit 555 and the transmitter body 551, the output magnetic unit 533 causes rotation of the output unit body 531 by attractive force or repulsive force provided by the transmitter magnetic unit 555.

Meanwhile, the object to the rotated is coupled to the output unit body 531 via the output shaft 537 and, therefore, the power generating device 5 of the present invention may rotate the object using only magnetic force.

As compared to a conventional power generating device that includes a magnetic field producer to produce a rotating magnetic field and an output unit to transmit power to an object to be rotated by being rotated by the rotating magnetic field, the power generating device 5 of the present invention has the following effects.

The power generating device 5 of the present invention may supply larger toque to the output unit 53 than that of the conventional power generating device because the power transmitter 55 transmits a reduced rotating magnetic field to the output unit 53. Accordingly, the power generating device 5 of the present invention has the effect of achieving a minimized volume as well as minimized power loss (enhanced efficiency) thereof as compared to the conventional power generating device.

In addition, the power generating device 5 of the present invention has the effect of causing less noise or vibration than the conventional power generating device having a planetary gear. This is because the power generating device 5 of the present invention achieves power transmission between the output unit 53 and the power generating unit 55 via a magnetic field produced by the permanent magnets.

In addition, in the power generating device 5 of the present invention, the output unit 53 is not restrained by the power transmitter 55 even if excessive load or sudden load is input to the output shaft 537 (this is because slip may occur between the output magnetic unit 533 and the transmitter magnetic unit 555) and, therefore, damage to the power generating device 5 due to the load may be prevented.

In addition, the power generating device 5 of the present invention may amplify magnetic force of the permanent magnets via the magnetic force amplifying units 535 and 557, which ensures reduction in the size and manufacturing costs of the power generating device 5.

FIGS. 4 and 5 show one embodiment of a clothes treatment apparatus 100 having the above-described power generating device 5.

The clothes treatment apparatus 100 as exemplarily shown in FIG. 4 includes a cabinet 1 forming an external appearance, a tub 2 placed in the cabinet 1, the tub 2 being configured to receive wash water therein, and a drum 3 placed in the tub 2, the drum 3 being configured to receive laundry therein, the drum 3 being rotated by the power generating device 5.

The cabinet 1 may include an opening 11 for introduction/removal of laundry and a door 13 rotatably coupled to the cabinet 1 to open or close the opening 11.

The cabinet 1 may incorporate a water supply unit to supply wash water into the tub 2, a drain unit to discharge wash water from the tub 2 and a detergent box 17 to supply detergent into the tub 2.

The detergent box 17 may be installed to be withdrawn from the cabinet 1 and may be connected to the tub 2 through a detergent supply pipe 18.

The water supply unit may include a water supply pipe 15 connecting the tub 2 and a water supply source (not shown) to each other. Under provision of the detergent box 17, the water supply pipe 15 may be installed to connect the water supply source and the detergent box 17 to each other.

The drain unit may include a drainpipe 161 to provide communication between the interior of the tub 2 and the exterior of the cabinet 1. The drainpipe 161 may be provided with a pump 163.

The tub 2 may take the form of a cylinder having an empty inner space. The tub 2 may be provided at a front surface thereof facing the opening 11 with a tub opening 21 to communicate with the opening 11.

A gasket 23 may be interposed between the tub opening 21 and the opening 11 to prevent leakage of wash water stored in the tub 2 and to prevent transmission of vibration from the tub 2 to the cabinet 1.

The tub 2 is fixed to the cabinet 1 using a tub support member 4. The tub support member 4 may serve to reduce vibration of the tub 2.

That is, the tub support member 4 may be a spring or a damper, for example, interposed between an outer circumferential surface of the tub 2 and the cabinet 1.

The drum 3 may take the form of a cylinder having an empty inner space and may be placed in the tub 2. The drum 3 is provided at a front surface thereof facing the opening 11 with a drum opening 31 to communicate with the tub opening 21.

Through the above-described configuration, a user may insert laundry into the drum 3 through the opening 11 and remove laundry stored in the drum 3 to the outside of the cabinet 1.

The drum 3 has a plurality of drum through-holes 35 perforated in a circumferential surface thereof, through which wash water inside the tub 2 may be introduced into the drum 3 and wash water inside the drum 3 may be discharged into the tub 2.

The above-described clothes treatment apparatus 100 is a clothes treatment apparatus having only a washing function (to remove contaminants from laundry using wash water).

Accordingly, when it is desired to achieve a clothes treatment apparatus having a drying function as well as a washing function, an air supply unit (not shown) to supply air into the drum 3 may be additionally mounted in the cabinet 1.

As exemplarily shown in FIG. 5, in the clothes treatment apparatus 100 having the above-described configuration, a rear surface of the tub 2 may serve as the support member 57.

That is, the magnetic field producer 51 and the power transmitter 55 of the power generating device 5 are installed to the rear surface of the tub 2. The magnetic field producer 51 is fixed to the rear surface of the tub 2 and the power transmitter 55 is rotatably coupled to the rear surface of the tub 2.

Meanwhile, the output shaft 537 penetrates the rear surface of the tub 2 to connect a rear surface of the drum 3 and the output unit body 531 to each other. The tub 2 may have a tub through-hole perforated in the rear surface thereof and the bearing 573 to rotatably support the output shaft 537 may be fitted into the tub through-hole.

With regard to the clothes treatment apparatus 100 having the above-described configuration, when current is supplied to the magnetic field producer 51, the transmitter magnetic unit 555 causes rotation of the transmitter body 551 in the course of being arranged by a rotating magnetic field provided by the magnetic field producer 51.

Through simultaneous rotation of the transmitter magnetic unit 555 and the transmitter body 551, the output magnetic unit 533 is rotated by attractive force or repulsive force provided by the transmitter magnetic unit 555 and, therefore, the drum 3 connected to the output unit body 531 via the output shaft 537 is also rotated.

FIGS. 6 and 7 show other embodiments of a clothes treatment apparatus having the power generating device 5 according to the present invention. The clothes treatment apparatuses according to these embodiments are configured to perform only a laundry drying function.

The clothes treatment apparatus 200 as exemplarily shown in FIG. 6 includes the cabinet 1, the drum 3 placed in the cabinet 1 to store laundry therein, the drum 3 being rotated by the power generating device 5, a front support member 7 and a rear support member 8 placed in the cabinet 1 to rotatably support the drum 3, and an air supply unit 9 to supply air into the drum 3.

The front support member 7 includes a support member body 71 fixed in the cabinet 1 and a through-hole 72 perforated in the support member body 71 for communication between the drum opening 31 and the opening 11.

The support member body 71 may be provided with a support member flange 73, the support member flange 73 being rotatably supported by the drum opening 31. The support member flange 73 may have a greater diameter than a diameter of the through-hole 72 to surround the through-hole 72.

The rear support member 8 is fixed in the cabinet 1 and spaced apart from the rear surface of the drum 3 by a predetermined distance. The drum 3 is rotatably supported by the rear support member 8 via the output shaft 537.

The air supply unit 9 serves to supply heated air or non-heated air into the drum 3. The air supply unit 9 may be configured to circulate air within the drum 3, or may be configured to supply outside air into the drum 3 and to discharge interior air of the drum 3 to the outside of the cabinet 1.

FIG. 6 shows the latter case. In this case, the air supply unit 9 may include a supply duct 91, through which air is supplied into the drum 3, and a discharge duct 95 through which interior air of the drum 3 is discharged outward from the cabinet 1.

The supply duct 91 supplies air into the drum 3 through an inlet hole 77 formed in the support member body 71. When a heater 93 is installed in the supply duct 91, heated air may be supplied into the drum 3.

The discharge duct 95 is installed to the front support member 7 and serves to connect an outlet hole 75 communicating with the interior of the drum 3 to the outside of the cabinet 1. A fan 97 is installed in the discharge duct 95.

Accordingly, when interior air of the drum 3 is discharged outward from the cabinet 1 by the fan 97, interior air of the cabinet 1 may be introduced into the drum 3 through the supply duct 91 and the heater 93 (outside air may be supplied into the cabinet 1 through communication holes 19 for communication between the interior of the cabinet 1 and the exterior of the cabinet 1).

Meanwhile, when the air supply unit 9 is configured to circulate interior air of the drum 3, the supply duct 91 and the discharge duct 95 must be connected to each other and a condenser (not shown) may be provided between the heater 93 and the fan 97 to condense air discharged from the drum 3.

In the present embodiment, the power generating device 5 is supported by the rear support member 8 such that the rear support member 8 performs the role of the support member (57, in FIG. 1) of the power generating device 5.

That is, the magnetic field producer 51 is fixed to the rear support member 8 and the power transmitter 55 is rotatably coupled to the rear support member 8. The output shaft 537 penetrates the rear support member 8 to connect the output unit body 531 and the drum 3 to each other.

In this case, the rear support member 8 is provided with the bearing 537 to rotatably support the output shaft 537.

The clothes treatment apparatus 300 shown in FIG. 7 differs from the embodiment of FIG. 6 in terms of the facts that the rear support member 8 is omitted and that the power generating device 5 is supported by the cabinet 1.

That is, in the present embodiment, the front surface of the drum 3 is rotatably supported by the front support member 7 and the rear surface of the drum 3 is supported by the output shaft 537 that is rotatably coupled to the cabinet 1.

In this case, the magnetic field producer 51 of the power generating device 5 is fixed to the cabinet 1, the power transmitter 55 is rotatably coupled to the cabinet 1 and the output unit body 531 is fixed to the output shaft 537 so as to be located between the rear surface of the drum 3 and the cabinet 1.

FIG. 8 shows the case in which the power generating device according to the present invention is included in a vehicle.

The vehicle V includes a chassis C, a wheel W rotated by the power generating device 5 to move the chassis C and a steering unit to determine a movement direction of the chassis C by controlling the wheel W.

When the power generating device 5 of the present invention is included in the vehicle V, the support member 57 is connected to the chassis C via a vibration attenuating device, such as a damper 575, and the output shaft 537 is connected to the wheel W.

In (a) of FIG. 8, the magnetic field producer 51 and the power transmitter 55 are supported by the support member 57 and the output shaft 537 penetrates the support member 57 and is connected to the wheel W.

In this case, the magnetic field producer 51 is fixed to the support member 57, the power transmitter 55 is rotatably coupled to the support member 57 and the output shaft 537 penetrates the support member 57 to connect the wheel W and the output unit body 531 to each other.

The output shaft 537 may be rotatably supported by the bearing 537 included in the support member 57.

In (b) of FIG. 8, the power generating device 5 is located in a space defined in the wheel W and has a feature of reducing a distance between the wheel W and the chassis C as compared to the embodiment of (a) of FIG. 8.

The power generating device 5 exemplarily shown in (b) of FIG. 8 is installed to the support member 57 that is connected to the chassis C via the vibration attenuating device.

The magnetic field producer 51 and the power transmitter 55 are installed to the support member 57 so as to face the wheel W. In addition, one end of the output shaft 537 is fixed to the wheel W and the other end of the output shaft 537 is rotatably supported by the support member 57. The output unit body 531 is fixed to the output shaft 537 and located in a space between the wheel W and the support member 57.

Meanwhile, the power generating device 5 according to the present invention may be provided at each wheel W. In this way, it is possible to minimize power loss caused by a power transmission method of a conventional vehicle (i.e. a method in which power generated by an engine is supplied to a wheel via a gear or a shaft).

In addition, the power generating device 5 according to the present invention may stably transmit power to the wheel W even if vibration of the wheel W occurs according to a surface flatness of the ground.

FIG. 9 shows a power generating device according to another embodiment of the present invention. As compared to the embodiment of FIG. 1, the power generating device 5 of FIG. 9 may further include a magnetic force induction unit for concentration of magnetic force.

The magnetic force induction unit according to the present invention includes at least one of a first magnetic force inducer provided between the transmitter magnetic unit 555 and the output magnetic unit 533 and a second magnetic force inducer provided between the magnetic field producer 51 and the transmitter magnetic unit 555.

As exemplarily shown in (b) of FIG. 10 and (c) of FIG. 10, the first magnetic force inducer 591 and 593 serves to induce magnetic force generated by the transmitter magnetic unit 555 to the output magnetic unit 533, and the second magnetic force inducer 595 and 597 serves to induce magnetic force generated by the magnetic field producer 51 to the transmitter magnetic unit 555.

As exemplarily shown in (a) of FIG. 10, the power generating device 5 having no magnetic force inducer may disadvantageously cause leakage of some of magnetic force generated by one transmitter magnetic unit 555 and some of magnetic force generated by one output magnetic unit 533. That is, the configuration shown in (a) of FIG. 10 inevitably causes reduction in the number of magnetic wires involved in power transmission.

On the other hand, as exemplarily shown in (b) of FIG. 10 and in (c) of FIG. 10, when the magnetic force inducer including magnetic substances (e.g., conductors and metal pieces) is provided between an object that supplies magnetic force and an object that receives magnetic force, leakage of magnetic force may be minimized and the number of magnetic wires involved in power transmission may be increased. In this way, the configuration shown in (b) of FIG. 10 and the configuration shown in (c) of FIG. 10 enable more effective power transmission than the configuration shown in (a) of FIG. 10.

Although the magnetic force inducers to achieve the above-described effect may include at least one of the first magnetic force inducer 591 and 593 and the second magnetic force inducer 593 and 595, the following description is based on the case in which both the first magnetic force inducer and the second magnetic force inducer are provided.

As exemplarily shown in (b) of FIG. 10, the first magnetic force inducer may include a first magnetic substance (591, a reference magnetic substance of the first magnetic force inducer) fixed to the base 5311 of the output unit body 531 to face a transmitter magnetic unit 555a located at the shortest distance from an output magnetic unit 533a, and one or more second magnetic substances (593, sub magnetic substances of the first magnetic force inducer) which are located respectively between one transmitter magnetic unit 555 and one output magnetic unit 533 and have a corresponding arrangement order on the basis of each of the transmitter magnetic unit 555a and the output magnetic unit 533a with the first magnetic substance 591 interposed therebetween.

The first magnetic substance 591 and the second magnetic substances 593 must be spaced apart from each other by a predetermined distance. As exemplarily shown in the drawing, the second magnetic substances 593 may be symmetrically located about a straight line that passes a symmetrical axis X of the first magnetic substance 591.

Moreover, a non-magnetic substance may be located between one magnetic substance 591 or 593 and another magnetic substance 593 or 591. This serves to prevent magnetic force, transmitted from the transmitter magnetic unit 555 to the output magnetic unit 533 via one magnetic substance 591 or 593, from interfering with the adjacent magnetic substance 591 or 593.

In addition, the respective magnetic substances 591 and 593 of the first magnetic force inducer may be a stack of plural metal plates. In this case, the respective metal plates may be separated from one another by non-magnetic substances. That is, each of the magnetic substances 591 and 593 of the first magnetic force inducer includes a metal plate fixed to a surface of the base 5311, a non-magnetic substance located on the top of the metal plate and a metal plate stacked on the top of the non-magnetic substance.

This configuration of the respective magnetic substances 591 and 593 in the form of a stack of the plural metal plates may minimize loss of magnetic force in a direction perpendicular to the drawing ((b) of FIG. 10).

To maximize the above-described effect, each of the magnetic substances 591 and 593 of the first magnetic force inducer may include a first non-magnetic substance fixed to the surface of the base 5311, a first metal plate fixed to the top of the first non-magnetic substance, a second non-magnetic substance located on the top of the first metal plate, a second metal plate stacked on the top of the second non-magnetic substance and a third non-magnetic substance located on the top of the second metal plate.

Meanwhile, the second magnetic force inducer may include a third magnetic substance (595, a reference magnetic substance of the second magnetic force inducer) fixed to the base 5311 to face the transmitter magnetic unit 555*a* at the shortest distance from a protrusion 515*a*, and one or more fourth magnetic substances (597, sub magnetic substances of the second magnetic force inducer) which are located respectively between one protrusion 515 and one transmitter magnetic unit 555 and have a corresponding arrangement order on the basis of each of the protrusion 555*a* and the transmitter magnetic unit 555*a* with the third magnetic substance 595 interposed therebetween.

The third magnetic substance 595 and the fourth magnetic substances 597 must be spaced apart from each other by a predetermined distance, and the fourth magnetic substances 597 may be symmetrically located about a straight line that passes a symmetrical axis Y of the third magnetic substance 595.

The respective magnetic substances 595 and 597 of the second magnetic force inducer may have the same configuration as the respective magnetic substances 591 and 593 of the first magnetic force inducer.

That is, the third magnetic substance 595 and the fourth magnetic substances 597 may be spaced apart from one another and separated from one another by non-magnetic substances disposed therebetween.

In addition, each of the magnetic substances 595 and 597 of the second magnetic force inducer may be a stack of plural metal plates and the metal plates may be separated from one another by non-magnetic substances.

When the power generating device 5 having the magnetic force inducers is included in the clothes treatment apparatus, the clothes treatment apparatus may have the configuration of FIG. 4.

In the case of FIG. 4, the rear surface of the tub 2 serves as the support member 57 of the power generating device 5. Thus, the magnetic field producer 51 is fixed to the rear surface of the tub 2, the power transmitter 55 is rotatably coupled to the rear surface of the tub 2, and the output shaft 537 penetrates the rear surface of the tub 2 to connect the rear surface of the drum 3 and the output unit body 531 to each other.

Meanwhile, the second magnetic force inducer 595 and 597 provided at the rear surface of the tub 2 may increase the number of magnetic wires through which magnetic force is transmitted from the magnetic field producer 51 to the transmitter magnetic unit 555, thereby enhancing power transmission efficiency.

In addition, the first magnetic force inducer 591 and 593 provided at the rear surface of the tub 2 may serve to increase the number of magnetic wires through which magnetic force is transmitted from the transmitter magnetic unit 555 to the output magnetic unit 533.

Meanwhile, the power generating device 5 having the magnetic force inducers (the power generating device of FIG. 9) may be included in the clothes treatment apparatus having the configuration of FIGS. 6 and 7 as well as the vehicle having the configuration of FIG. 8.

FIGS. 12 and 13 show the clothes treatment apparatus 100 having the power generating device 5 according to a third embodiment of the present invention.

The clothes treatment apparatus 100 having the power generating device 5 according to the third embodiment includes the cabinet 1 forming an external appearance, the tub 2 placed in the cabinet 1, the tub 2 being configured to receive wash water therein, and the drum 3 placed in the tub 2, the drum 3 being configured to receive laundry therein, the drum 3 being rotated by the power generating device 5.

The cabinet 1 may include the opening 11 and the door 13 is provided to open or close the opening 11.

The tub 21 may have the tub opening 21 communicating with the opening 11 and the gasket 23 may be provided between the tub opening 21 and the opening 11.

The tub 2 may be provided at the rear surface thereof with a tub through-hole 27 for penetration of the output shaft 537 that will be described hereinafter. A bearing 29 may be fitted into the tub through-hole 27 to support the output shaft 537.

The tub 2 is fixed in the cabinet 1 by the tub support member 4. The tub support member 4 may serve as a vibration attenuating device to reduce vibration generated in the tub 2.

The drum 3 is rotatably placed in the tub 2. The drum 3 is provided at the front surface thereof facing the opening 11 with the drum opening 31 to communicate with the tub opening 21. The drum 3 is provided at the circumferential surface thereof with the drum through-holes 35.

The above-described clothes treatment apparatus 100 is a clothes treatment apparatus having only a washing function to wash laundry using water. Thus, an air supply unit (not shown) to supply air into the drum 3 must be additionally mounted in the case of a clothes treatment apparatus capable of washing and drying laundry.

Meanwhile, in the case of a clothes treatment apparatus having only a laundry drying function, the tub 2 shown in FIG. 1 may be removed from the clothes treatment apparatus, but the air supply unit (not shown) to supply air into the drum 3 must be provided.

For convenience of description, the following description is based on the configuration of the clothes treatment apparatus 100 having only a washing function.

The power generating device 5 as exemplarily shown in FIG. 12 may include the output unit 53 coupled to the output shaft 537 so as to be located at the exterior of the tub 2 and the magnetic field producer 51 to produce a rotating magnetic field so as to rotate the output unit 53.

The output unit 53 may include the disc-shaped output unit body 531 coupled to the output shaft 537 and the output magnetic unit 533 attached to the circumferential surface of the output unit body 531 such that magnetic poles thereof are alternately exposed.

As exemplarily shown in FIG. 13, the output magnetic unit 533 may include a plurality of permanent magnets having the first magnetic poles (N-poles, 5331) and the second magnetic poles (S-poles, 5332).

In this case, when one permanent magnet of the output magnetic unit 533 is fixed to the output unit body 531 via the second pole 5332, the neighboring permanent magnet must be fixed to the output unit body 531 via the first magnetic pole 5331.

Although not shown in the drawing, the output magnetic unit 533 may be installed to the output unit body 531 so as to expose only one magnetic pole. In this case, the respective neighboring output magnetic units must be spaced apart from each other by the same distance.

Meanwhile, the magnetic field producer 51 may be located at any position inside the cabinet 1 so long as it may provide the output magnetic unit 533 with a rotating magnetic field. FIG. 13 shows the case in which the magnetic field producer 51 is fixed to the rear surface of the tub 2 by way of example.

Although not shown in the drawing, the magnetic field producer 51 may be fixed to the cabinet 1 to provide the output magnetic unit 533 with a rotating magnetic field.

The magnetic field producer 51 may include the body 511 fixed to the tub 2 or the cabinet 1, the protrusions 515 radially protruding from the circumferential surface of the body 511 and the coil unit 517 wound around the protrusions 515.

The body 511 of the magnetic field producer 51 may be located at the outside of the output unit body 531. That is, the body 511 has a smaller diameter than a diameter of the output unit body 531 and is eccentrically located from the output shaft 537 (the center of the body 511 and the center of the output unit body 531 do not coincide with each other and are spaced apart from each other by a predetermined distance).

FIG. 13 shows the case in which the magnetic field producer 51 is fixed to the tub 2 such that the circumferential surface of the body 511 is spaced apart from the output magnetic unit 533 located at the circumferential surface of the output unit body 531 by way of example.

The power generating device 5 according to the present invention is configured to rotate the drum 3 while preventing the output magnetic unit 533 from coming into contact with the magnetic field producer 51, thereby causing less noise or vibration than a conventional belt-pulley type clothes treatment apparatus.

In addition, the power generating device 5 according to the present invention is configured such that the magnetic field producer 51 is located at the outside of the output unit 53 (a portion of the circumferential surface of the magnetic field producer 51 facing a portion of the circumferential surface of the output unit 53), rather than the output unit 53 surrounding the entire circumferential surface of the magnetic field producer 51. Thereby, the present invention may reduce a size of the magnetic field producer 51 as compared to a conventional direct-drive type clothes treatment apparatus.

Meanwhile, the output unit 53 may further include the output magnetic force amplifying unit 535 to amplify magnetic force of the output magnetic unit 533.

The output magnetic force amplifying unit 535 may take the form of a metal bar or cylinder provided at the circumferential surface of the output unit body 531 to support the output magnetic unit 533.

The output magnetic unit 533 may be inserted into the circumferential surface of the output unit body 531 differently from illustration of FIG. 13. This serves to minimize the volume of the output unit 53.

In this case, the output magnetic force amplifying unit 535 may be located in an insertion recess (not shown) indented in the circumferential surface of the output unit body 531 to support the output magnetic unit 533.

FIG. 14 shows the clothes treatment apparatus having the power generating device 5 according to a fourth embodiment. The power generating device 5 according to the present embodiment may further include the power transmitter 55.

As exemplarily shown in (a) of FIG. 14, the power transmitter 55 is rotatably installed between the output unit 53 and the magnetic field producer 51 and serves to transmit power of the magnetic field producer 51 to the output unit 53.

The power transmitter 55 according to the present embodiment transmits power provided by the magnetic field producer 51 using magnetic force to the output unit 53 and, therefore, the circumferential surface of the power transmitter 55 does not come into contact with not only the circumferential surface of the magnetic field producer 51 but also the circumferential surface of the output unit 53.

When the power transmitter 55 is provided between the magnetic field producer 51 and the output unit 53, a diameter of the output unit body 531 may be reduced and, in turn, reduction in the diameter of the output unit body 531 has the effect of fixing a device, required for washing or drying of laundry, to the rear surface of the tub 2.

That is, as exemplarily shown in (b) of FIG. 14, when a diameter of the output unit body 531 is reduced, an extra space may occur at the rear surface of the tub 2. Therefore, the air supply unit (9, i.e. a device that discharges interior air of the tub 2 through the rear surface of the tub 2 and thereafter supplies hot air into the tub 2 through the front surface of the tub 2, or a device that heats outside air of the tub 2 and supplies the same into the tub 2) may be coupled to the rear surface of the tub 2.

In addition, when the magnetic field producer 51 and the output unit 53 may not be arranged adjacent to each other due to an interior configuration of the clothes treatment apparatus, the power transmitter 55 may be available as a device to transmit power of the magnetic field producer 51 to the output unit 53.

The power transmitter 55 may include the disc-shaped transmitter body 551 rotatably coupled to the rear surface of the tub 2 and the transmitter magnetic unit 555 provided at the circumferential surface of the transmitter body 551.

The transmitter body 551 is rotated about the transmitter rotating shaft 553 supported by the tub 2 and the transmitter magnetic unit 555 may include a plurality of permanent magnets having the first magnetic poles (N-poles, 5551) and the second magnetic poles (S-poles, 5552).

Meanwhile, although not shown in FIG. 14, a transmitter magnetic force amplifying unit may be further provided at the circumferential surface of the transmitter body 551 to amplify magnetic force of the transmitter magnetic unit 555.

Configuration and effects of the transmitter magnetic force amplifying unit (not shown) are identical to those of the above-described output magnetic force amplifying unit 519 and, thus, a detailed description thereof will be omitted below.

The power generating device 5 having the power transmitter 55 does not require speed reduction of the output unit 53 by a gear and, therefore, may achieve minimized loss of power supplied to the magnetic field producer 51 and efficient power transmission to the output unit 53 (enhanced efficiency of the power generating device 5) and may reduce noise or vibration caused during rotation of the output unit 53. This is because the power generating device 5 according to the present embodiment achieves power transmission between the magnetic field producer 51, the power transmitter 55 and the output unit 53 via a magnetic field rather than a gear.

In addition, the power transmitter 55 rotates the output unit 53 using attractive force and, therefore, load applied to the output shaft 537 may be reduced (attractive force between magnetic units reduces load of the drum applied to the output shaft). This may minimize deterioration in the durability of the bearing 29 that supports the output shaft and a device (not shown) to seal the output shaft.

Although the power transmitter 55 has been described above as being coupled to the rear surface of the tub 2 to transmit power provided by the magnetic field producer 51 to the output unit 53, the power transmitter 55 according to the present embodiment may be installed to the cabinet 1 to transmit power provided by the magnetic field producer 51 to the output unit 53.

FIG. 15 shows the power generating device 5 according to a fifth embodiment.

The output unit 53 according to the present embodiment includes the disc-shaped output unit body 531 connected to the drum 3 via the output shaft 537 and a first flange 538 and a second flange 539 protruding from a surface of the output unit body 531 in a circumferential direction of the output unit body 531.

The first flange 538 and the second flange 539 may take the form of a cylinder having one open side. The second flange 539 has a greater diameter than a diameter of the first flange 538.

Meanwhile, the first flange 538 and the second flange 539 may protrude from a surface of the output unit body 531, parallel to the rear surface of the tub 2, to the rear surface of the tub 2 (FIG. 15), or may protrude from the surface of the output unit body, 531, parallel to the rear surface of the cabinet 1, to the cabinet 1.

In any case, the output magnetic unit of the output unit 53 includes a first flange magnetic unit 534 provided at an outer circumferential surface of the first flange 538 (i.e. a circumferential surface of the first flange 538 facing the second flange 539) and a second flange magnetic unit 536 provided at an inner circumferential surface of the second flange 539 (i.e. a circumferential surface of the second flange 539 facing the first flange 538).

The first flange magnetic unit 534 and the second flange magnetic unit 536 may respectively include permanent magnets having first magnetic poles (N-poles, 5341 or 5361) and second magnetic poles (S-poles, 5342 or 5362).

When the first flange 538 and the second flange 539 protrude toward the tub 2, the magnetic field producer 51 is fixed to the rear surface of the tub 2 and located between the first flange magnetic unit 534 and the second flange magnetic unit 536.

On the other hand, when the first flange 538 and the second flange 539 protrude toward the cabinet 1, the magnetic field producer 51 may be fixed to the cabinet 1 and located between the first flange magnetic unit 534 and the second flange magnetic unit 536.

The clothes treatment apparatus 100 having the above-described configuration generates a rotating magnetic field in a circumferential direction of the body 511 when alternating current is supplied to the coil unit 517 and the first flange magnetic unit 534 and the second flange magnetic unit 536 rotate the output unit body 531 in the same direction by the rotating magnetic field.

Various methods may be adopted to allow the first flange magnetic unit 534 and the second flange magnetic unit 536 to rotate the output unit body 531 in the same direction by the rotating magnetic field provided by the single magnetic field producer 51.

That is, as exemplarily shown in FIG. 16, a distance between the circumferential surface of the body 511 and the first flange magnetic unit 534 may be shorter than a distance between the circumferential surface of the body 511 and the second flange magnetic unit 536. In this case, since magnetic force supplied to the first flange magnetic unit 534 will be greater than magnetic force supplied to the second flange magnetic unit 536, a rotating direction of the output unit body 531 may be determined by a direction of the rotating magnetic field supplied to the first flange magnetic unit 534.

In addition, the first flange magnetic unit 534 and the second flange magnetic unit 536 may rotate the output unit body 531 in the same direction by appropriately adjusting the number of permanent magnets of the first flange magnetic unit 534, the number of permanent magnets of the second flange magnetic unit 536, a magnitude of magnetic force of each magnetic unit 534 or 536, a width of each magnetic unit 534 or 536 (a length of each magnetic unit 534 or 536 parallel to a circumferential direction of the output unit body 531) and a period of alternating current supplied to the coil unit 517.

In addition, as the number of permanent magnets of each magnetic unit 534 or 536, a position of each magnetic unit 534 or 536, a period of alternating current supplied to the coil unit 517 and the like are adjusted to allow the first flange magnetic unit 534 to be rotated by attractive force of the rotating magnetic field and to allow the second flange magnetic unit 536 to be rotated by repulsive force of the rotating magnetic field, the first flange magnetic unit 534 and the second flange magnetic unit 536 may rotate the output unit body 531 in the same direction.

Even in the case of the present embodiment, the output magnetic force amplifying unit may be further provided to amplify magnetic force of each magnetic unit 534 or 536.

In this case, the output magnetic force amplifying unit may include a first magnetic force amplifying unit 5351 provided at the first flange 538 to support the first flange magnetic unit 534 and a second magnetic force amplifying unit 5353 provided at the second flange 539 to support the second flange magnetic unit 536.

A feature of the magnetic force amplifying unit has been described above and, thus, a detailed description thereof will be omitted below.

FIG. 17 shows a vehicle having the power generating device 5 of FIG. 12.

The vehicle V according to the present embodiment includes the chassis C, the wheel W rotated by the power generating device 5 to move the chassis C and the steering unit to determine a movement direction of the chassis C by controlling the wheel W.

When the power generating device 5 of FIG. 12 is included in the vehicle V, the power generating device 5 includes the support member 57 connected to the chassis C by a vibration attenuating device, such as the damper 575, the magnetic field producer 51 fixed to the support member 57, the output shaft 537 penetrating the support member 57 to thereby be connected to the wheel W and the output unit 53 fixed to the output shaft 537 so as to be rotated by the magnetic field producer 51.

A shape and configuration of the output unit 53 are identical to a configuration of the output unit of the above-described embodiment except for the fact that the output shaft 537 is coupled to the wheel W and, thus, a detailed description thereof will be omitted below.

The output shaft 537 penetrates the support member 57 to connect the wheel W and the output unit body 531 to each other. The output shaft 537 is rotatably supported by the support member 57 via the bearing 573 fitted into the support member through-hole 571.

The magnetic field producer 51 according to the present embodiment is arranged such that the circumferential surface thereof faces the circumferential surface of the output unit body 511 (the circumferential surface of the magnetic field producer 51 is spaced apart from a surface of the output magnetic unit 533 by a predetermined distance).

That is, the magnetic field producer 51 according to the present embodiment is fixed to the support member 57 such that a distance from the output shaft (537, the center of the output unit body 531) to the circumferential surface of the magnetic field producer 51 is greater than a distance from the output shaft 537 to the surface of the output magnetic unit 533.

In the present embodiment, the power generating device 5 may be allotted to each wheel W, which may minimize power loss due to a power transmission method of a conventional vehicle (i.e. a method in which power generated by an engine is supplied to the wheel via a gear or a shaft).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

MODE FOR THE INVENTION

As described above, a related description has sufficiently been discussed in the above "Best Mode" for implementation of the present invention.

INDUSTRIAL APPLICABILITY

As described above, the present invention may be wholly or partially applied to a power generating device and an apparatus having the same.

The invention claimed is:

1. A clothes treatment apparatus comprising:
a cabinet having an opening for introduction/removal of laundry;
a drum rotatably placed in the cabinet to store laundry therein, the drum having a drum opening communicating with the opening;
a magnetic field producer configured to produce a rotating magnetic field;
a power transmitter provided outside the magnetic field producer, and including a plurality of permanent magnets arranged on a circumferential surface of the power transmitter to be rotated by the rotating magnetic field provided by the magnetic field producer; and
an output unit provided to receive the power transmitter, and including a plurality of permanent magnets arranged on an inner peripheral surface of the output unit to convert the rotating magnetic field provided by the power transmitter to torque so as to rotate the drum,
a magnetic force inducer provided on the output unit, and including a plurality of lines extended from an outer circumferential surface of the power transmitter to an inner circumferential surface of the magnetic field producer or an inner circumferential surface of the output unit,
wherein the plurality of lines are made of a metal material that concentrates and guides the rotating magnetic field,
wherein a rotation axis of the power transmitter is provided outside the magnetic field producer.

2. The apparatus according to claim 1, further comprising a tub disposed in the cabinet to provide a space in which the drum is received,
wherein the magnetic field producer is fixed to the tub,
wherein the output unit rotates an output shaft, the output shaft penetrating the tub and being connected to the drum, and
wherein the power transmitter is rotatably coupled to the tub, the power transmitter being located between the magnetic field producer and the output unit.

3. The apparatus according to claim 2, wherein the output unit includes an output unit body fixed to the output shaft and an output magnetic unit fixed to the output unit body, and
wherein the power transmitter includes a transmitter body rotatably coupled to the tub, the transmitter body being located between the output magnetic unit and the magnetic field producer, and a transmitter magnetic unit fixed to the transmitter body, the transmitter magnetic unit providing the output magnetic unit with magnetic force to rotate the output unit body.

4. The apparatus according to claim 3, wherein the output unit body has a disc shape, and the transmitter body has a disc shape,
wherein the plurality of permanent magnets are arranged on a circumferential surface of the output unit body such that N-poles and S-poles are alternately exposed, and
wherein the plurality of permanent magnets are arranged on a circumferential surface of the transmitter body such that N-poles and S-poles are alternately exposed.

5. The apparatus according to claim 3, wherein the output unit body has a disc shape, and the transmitter body has a disc shape,
wherein the output magnetic unit includes a plurality of permanent magnets arranged on a circumferential surface of the output unit body such that N-poles and S-poles are alternately exposed, and
wherein the transmitter magnetic unit includes a plurality of permanent magnets spaced apart from one another by a predetermined distance along a circumferential surface of the transmitter body such that only N-poles or S-poles are exposed.

6. The apparatus according to claim 3, wherein the output unit body has a disc shape, and the transmitter body has a disc shape,
wherein the output magnetic unit includes a plurality of permanent magnets spaced apart from one another by a predetermined distance along a circumferential surface of the output unit body such that only N-poles or S-poles are exposed, and
wherein the transmitter magnetic unit includes a plurality of permanent magnets arranged on a circumferential surface of the transmitter body such that N-poles and S-poles are alternately exposed.

7. The apparatus according to claim 3, the magnetic force inducer comprising:
a first magnetic force inducer configured to induce magnetic force generated by the transmitter magnetic unit to the output magnetic unit; and/or
a second magnetic force inducer located between the magnetic field producer and the transmitter magnetic unit to induce magnetic force generated by the magnetic field producer to the transmitter magnetic unit.

8. The apparatus according to claim 7, wherein the first magnetic force inducer includes:
a reference magnetic substance fixed to the output unit body to face the transmitter magnetic unit located at a shortest distance from the output magnetic unit; and
one or more sub magnetic substances located respectively between one transmitter magnetic unit and one output magnetic unit having a corresponding arrangement order based on each of the transmitter magnetic unit and the output magnetic unit with the reference magnetic substance interposed therebetween.

9. The apparatus according to claim 8, wherein the reference magnetic substance and the sub magnetic substances are spaced apart from one another by a predetermined distance.

10. The apparatus according to claim 8, wherein the sub magnetic substances are symmetrically located about a straight line, the straight line passing a symmetrical axis of the reference magnetic substance.

11. The apparatus according to claim 8, wherein each of the reference magnetic substance and the sub magnetic substances is a stack of plural metal plates and one metal plate and another metal plate are separated from each other by a non-magnetic substance.

12. The apparatus according to claim 8, wherein each of the reference magnetic substance and the sub magnetic substances includes a non-magnetic substance fixed to the output unit body, a metal plate fixed to the non-magnetic substance and a non-magnetic substance fixed to the metal plate.

13. The apparatus according to claim 7, wherein the magnetic field producer includes:
a body fixed in the cabinet, the body being a magnetic substance;
a plurality of protrusions radially protruding from a circumferential surface of the body; and
a coil unit including at least two coils configured to receive alternating current from an external power source, each coil being fixed to different protrusions among the protrusions.

14. The apparatus according to claim 7, wherein the second magnetic force inducer includes:
a reference magnetic substance fixed to the output unit body to face the transmitter magnetic unit located at a shortest distance from the protrusions; and
a sub magnetic substance located between one protrusion and one transmitter magnetic unit having a corresponding arrangement order based on each of the protrusion and the transmitter magnetic unit located at positions corresponding to the reference magnetic substance.

15. The apparatus according to claim 3, further comprising:
an output magnetic force amplifying unit provided at the output unit body to amplify magnetic force of the output magnetic unit; and/or
a transmitter magnetic force amplifying unit provided at the transmitter body to amplify magnetic force of the transmitter magnetic unit.

16. The apparatus according to claim 15, wherein the output magnetic force amplifying unit includes a metal fixed to the output unit body to support the output magnetic unit, and
wherein the transmitter magnetic force amplifying unit includes a metal fixed to the transmitter body to support the transmitter magnetic unit.

17. The apparatus according to claim 1, further comprising:
a front support member disposed in the cabinet to rotatably support the drum opening, the front support member having a through-hole communicating with the opening; and
a rear support member disposed in the cabinet,
wherein the magnetic field producer is fixed to the rear support member,
wherein the output unit includes an output shaft penetrating the rear support member to thereby be connected to the drum, an output unit body fixed to the output shaft and an output magnetic unit fixed to the output unit body, and
wherein the power transmitter includes a transmitter body rotatably coupled to the rear support member, the transmitter body being located between the magnetic field producer and the output magnetic unit, and a transmitter magnetic unit fixed to the transmitter body, the transmitter magnetic unit providing the output magnetic unit with magnetic force.

18. The apparatus according to claim 1, further comprising a front support member placed in the cabinet to rotatably support the drum opening, the front support member having a through-hole communicating with the opening,
wherein the magnetic field producer is fixed to the cabinet,
wherein the output unit includes an output shaft rotatably installed to the cabinet to thereby be connected to the drum, an output unit body fixed to the output shaft and an output magnetic unit fixed to the output unit body, and
wherein the power transmitter includes a transmitter body rotatably coupled to the cabinet, the transmitter body being located between the magnetic field producer and the output magnetic unit, and a transmitter magnetic unit fixed to the transmitter body, the transmitter magnetic unit providing the output magnetic unit with magnetic force.

19. The apparatus according to claim 1, wherein the plurality of lines of the magnetic force inducer extend from the plurality of permanent magnets of the power transmitter to the plurality of permanent magnets of the output unit or protrusions of the magnetic field producer.

20. The apparatus according to claim 19, wherein one end of the plurality of lines is spaced apart from the plurality of permanent magnets of the power transmitter,
wherein the other end of the plurality of lines is spaced apart from surface of the protrusions of the magnetic field producer or surface of the plurality of permanent magnets of the output unit.

* * * * *